United States Patent
Wang et al.

(10) Patent No.: US 11,979,297 B2
(45) Date of Patent: May 7, 2024

(54) NETWORK SLICE PROCESSING METHOD, SYSTEM AND DEVICE, AND STORAGE MEDIUM

(71) Applicant: TENCENT TECHNOLOGY (SHENZHEN) COMPANY LIMITED, Guangdong (CN)

(72) Inventors: Tao Wang, Shenzhen (CN); Yunfei Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 394 days.

(21) Appl. No.: 17/325,297

(22) Filed: May 20, 2021

(65) Prior Publication Data

US 2021/0273861 A1     Sep. 2, 2021

Related U.S. Application Data

(63) Continuation of application No. PCT/CN2020/074787, filed on Feb. 12, 2020.

(30) Foreign Application Priority Data

Feb. 28, 2019 (CN) .......................... 201910152800.8

(51) Int. Cl.
  *H04L 41/5003*   (2022.01)
  *H04W 28/02*   (2009.01)
  *H04W 28/06*   (2009.01)

(52) U.S. Cl.
  CPC ..... *H04L 41/5003* (2013.01); *H04W 28/0268* (2013.01); *H04W 28/06* (2013.01)

(58) Field of Classification Search
  None
  See application file for complete search history.

(56) References Cited

U.S. PATENT DOCUMENTS 7,969,886 B1 *    6/2011   Hoichman .......... H04L 41/0896
                                                              370/252
2005/0210515 A1 *  9/2005   Roh ....................... H04N 7/163
                                                              725/62

(Continued)

FOREIGN PATENT DOCUMENTS

CN          106922002 A    7/2017
CN          107770794 A    3/2018

(Continued)

OTHER PUBLICATIONS

Translation of the Written Opinion of the International Searching Authority dated May 9, 2020 in International Application No. PCT/CN2020/074787.

(Continued)

*Primary Examiner* — Andrew C Oh
(74) *Attorney, Agent, or Firm* — Sughrue Mion, PLLC

(57) ABSTRACT

Embodiments of the disclosure disclose a network slice processing method, system, and device, and a storage medium. The method is applicable to a network management system, and includes: virtualizing functions of a mobile communication network to obtain a plurality of isolated logical subnetworks, and using each logical subnetwork as a network slice; generating a slice-level quality of service (QoS) parameter for each network slice, the slice-level QoS parameter being used by the network management system to instruct a slice processing device to control a first resource corresponding to the network slice; and transmitting the slice-level QoS parameter to the slice processing device.

16 Claims, 10 Drawing Sheets

(56) References Cited

U.S. PATENT DOCUMENTS

| | | | | |
|---|---|---|---|---|
| 2008/0144497 | A1* | 6/2008 | Ramprashad | H04L 67/61 370/230.1 |
| 2010/0222054 | A1* | 9/2010 | Abraham | H04W 4/24 455/434 |
| 2012/0191824 | A1* | 7/2012 | Davis | H04L 41/083 709/220 |
| 2017/0303259 | A1* | 10/2017 | Lee | H04W 28/16 |
| 2017/0332421 | A1* | 11/2017 | Sternberg | H04W 12/069 |
| 2018/0199279 | A1* | 7/2018 | Baek | H04W 16/14 |
| 2018/0317134 | A1* | 11/2018 | Leroux | H04L 61/5038 |
| 2019/0102717 | A1* | 4/2019 | Wu | H04L 41/147 |
| 2019/0174320 | A1* | 6/2019 | Kodaypak | H04L 41/00 |
| 2020/0053834 | A1* | 2/2020 | Dahan | H04L 41/0816 |

FOREIGN PATENT DOCUMENTS

| | | | | |
|---|---|---|---|---|
| CN | 109743213 A | | 5/2019 | |
| CN | 109309939 B | * | 11/2020 | ........ H04W 36/0016 |
| CN | 111586772 B | * | 6/2021 | ........ H04W 36/0011 |
| JP | 2020025210 A | * | 2/2020 | |
| WO | WO-2017034352 A1 | * | 3/2017 | ........ H04L 65/1016 |
| WO | WO-2017055887 A1 | * | 4/2017 | ........ H04L 12/5601 |
| WO | WO-2017168112 A1 | * | 10/2017 | ............ H04L 5/14 |
| WO | 2018/033074 A1 | | 2/2018 | |
| WO | 2018/059317 A1 | | 4/2018 | |
| WO | 2018/059689 A1 | | 4/2018 | |
| WO | WO-2019012735 A1 | * | 1/2019 | ............ H04W 28/24 |
| WO | WO-2019158109 A1 | * | 8/2019 | ........ H04W 36/0016 |
| WO | WO-2019197883 A1 | * | 10/2019 | ........... H04L 63/108 |

OTHER PUBLICATIONS

Extended European Search Report dated Mar. 24, 2022 in European Application No. 20762495.8.
3GPP TR 28.801 V15.1.0, 3rd Generation Partnership Project; Technical Specification Group Services and System Aspects; Telecommunication management; Study on management and orchestration of network slicing for next generation network (Release 15), Jan. 2018 (75 pages total).
Khodapanah et al., "Fulfillment of Service Level Agreements via Slice-Aware Radio Resource Management in 5G Networks", 2018 IEEE 87th Vehicular Technology Conference (VTC Spring), Jun. 3, 2018, pp. 1-6 (6 pages total).
Office Action dated Feb. 21, 2023 from the Japanese Patent Office in Application No. 2021-540280.
China Mobile, "Draft Session Outcome of Slice SLA discussion in eNA", SA WG2 Meeting #131, Internet<URL: https://www.3gpp.org/ftp/tsg_sa/WG2_Arch/TSGS2_131_Tenerife/Docs/S2-1902482.zip>, Feb. 25-Mar. 1, 2019, pp. 1-9 (10 total pages).
China Mobile et al., Use Case NWDA-Assisted Slice SLA Guarantee and Related Key Issue Update, SA WG2 Meeting #128bis, S2-188476, Aug. 2018, 4 pages, Sophia Antipolis, France.
First Chinese Office Action for Application 2019101528008.8 dated Mar. 16, 2020.
Second Chinese Office Action for Application 2019101528008.8 dated Oct. 10, 2020.
Written Opinion for PCT/CN2020/074787 dated May 9, 2020.
International Search Report for PCT/CN2020/074787 dated May 9, 2020.

* cited by examiner

NETWORK SLICE PROCESSING METHOD, SYSTEM AND DEVICE, AND STORAGE MEDIUM

CROSS-REFERENCE TO RELATED APPLICATION(S)

This application is a bypass continuation application of International Application No. PCT/CN2020/074787, entitled "NETWORK SLICE PROCESSING METHOD, SYSTEM AND DEVICE, AND STORAGE MEDIUM" and filed Feb. 12, 2020, which claims priority to Chinese Patent Application No. 201910152800.8, entitled "NETWORK SLICE PROCESSING METHOD, DEVICE, AND SYSTEM" and filed with the China National Intellectual Property Administration on Feb. 28, 2019, the disclosures of which are herein incorporated by reference in their entireties.

FIELD

The disclosure relates to the field of computer technologies, and in particular, to a network slice processing method, system, and device and a storage medium.

BACKGROUND

The network slice technology is an essential basic technology in a network of a fifth-generation (5G) mobile communication technology. Network slicing can provide isolated, function-customized and performance-customized, quality-reliable, end-to-end logical private network service to industry clients.

Currently, the quality of a slice in a 5G network can be guaranteed and is achieved mainly through a quality of service (QoS) mechanism. However, the existing QoS mechanism is only for a user equipment (UE) level, or for a data flow level, or for a session level.

Due to limited resources of a wireless air interface, it is difficult for operators to meet requirements of the industry clients for slices. It is difficult for the industry clients to order and use slice services provided by the operators. Consequently, the slices cannot provide service functions to the industry clients.

SUMMARY

Example embodiments of the disclosure provide a network slice processing method, system, and device, and a storage medium, to control slice-level resources, so that a network slice may provide a slice-level service function.

The embodiments of the disclosure provide the following solutions:

According to one aspect, an embodiment of the disclosure provides a network slice processing method, applicable to a network management system and including:
 virtualizing functions of a mobile communication network to obtain a plurality of isolated logical subnetworks, and using each logical subnetwork as a network slice;
 generating a slice-level quality of service (QoS) parameter for each network slice, the slice-level QoS parameter being used by the network management system to instruct a slice processing device to control a first resource corresponding to the network slice; and
 transmitting the slice-level QoS parameter to the slice processing device.

According to another aspect, an embodiment of the disclosure further provides a network slice processing method, applied to a slice processing device and including:
 receiving a slice-level quality of service (QoS) parameter from a network management system, the a slice-level QoS parameter being generated for each network slice, which corresponds to each of a plurality of isolated logical subnetworks obtained from the network management system based on virtualizing functions of a mobile communication network; and
 controlling a first resource corresponding to the network slice according to the slice-level QoS parameter.

According to another aspect, an embodiment of the disclosure provides a network management system, including at least one memory configured to store program code; and at least one processor configured to read the program code and operate as instructed by the program code, the program code including: virtualization code configured to cause at least one of the at least one processor to virtualize functions of a mobile communication network to obtain a plurality of isolated logical subnetworks, and use each logical subnetwork as a network slice; generation code configured to cause at least one of the at least one processor to generate a slice-level quality of service (QoS) parameter for each network slice, the slice-level QoS parameter being used by the network management system to instruct a slice processing device to control a first resource corresponding to the network slice; and transmission code configured to cause at least one of the at least one processor to transmit the slice-level QoS parameter to the slice processing device.

According to another aspect, an embodiment of the disclosure provides a slice processing device, including a processor and a memory, the memory being configured to store instructions, and the processor being configured to execute the instructions in the memory, so that the slice processing device performs the method according to any one of the foregoing aspects.

According to another aspect, an embodiment of the disclosure provides a network slice processing system, including:
 the network management system according to any one of the foregoing aspects and the slice processing device according to any one of the foregoing aspects.

According to another aspect, an embodiment of the disclosure provides a computer-readable storage medium, the computer-readable storage medium storing instructions, the instructions, when run on a computer, causing the computer to perform the method according to the foregoing aspects.

BRIEF DESCRIPTION OF THE DRAWINGS

To describe the technical solutions in the example embodiments of the disclosure more clearly, the following briefly introduces the accompanying drawings required for describing the embodiments. Apparently, the accompanying drawings in the following description show merely some example embodiments of the disclosure, and a person skilled in the art may still derive other drawings from these accompanying drawings.

DETAILED DESCRIPTION

Embodiments of the disclosure provide a network slice processing method, system, and device, to control slice-level resources, so that a network slice may provide a slice-level service function.

To make the objectives, features, and advantages of the disclosure clearer and more comprehensible, the following clearly and completely describes the technical solutions in the embodiments of the disclosure with reference to the accompanying drawings in the embodiments of the disclosure. Apparently, the embodiments described below are merely some rather than all of the embodiments of the disclosure. All other embodiments obtained by a person skilled in the art based on the embodiments of the disclosure shall fall within the protection scope of the disclosure.

The terms "include", "contain" and any other variants thereof in the specification, claims, and accompanying drawings of the disclosure are intended to cover a non-exclusive inclusion, so that a process, method, system, product, or device that includes a series of units is not necessarily limited to those units, but may include other units not expressly listed or inherent to such a process, method, product, or device.

Figure 1:
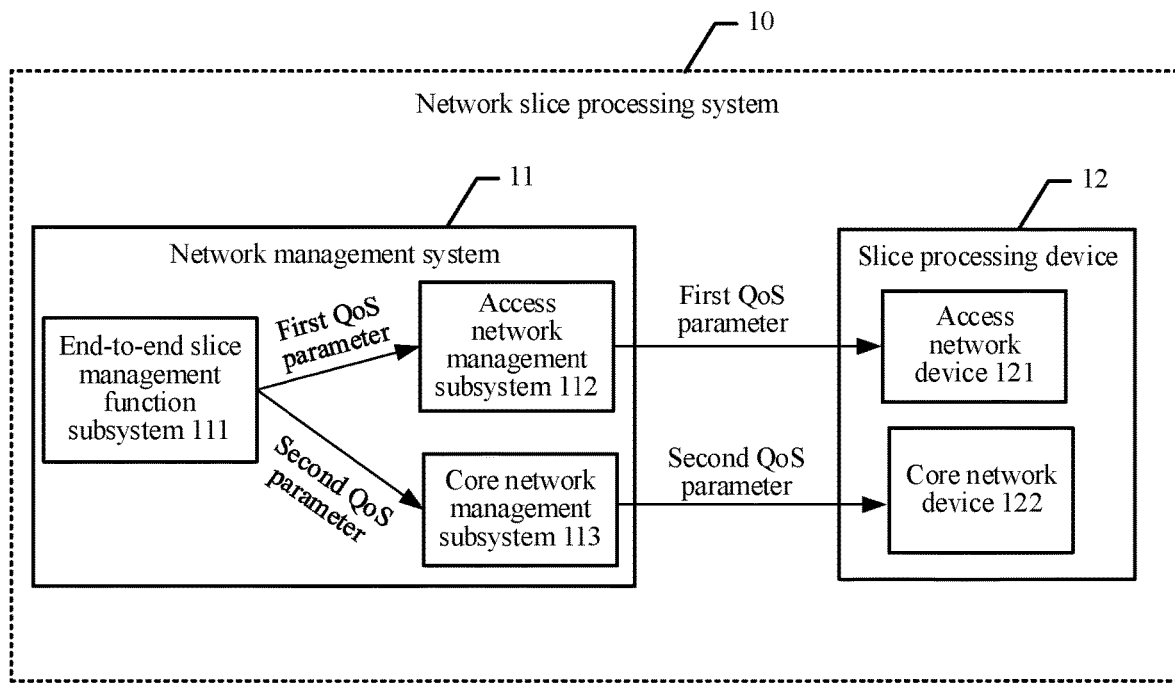
FIG. 1 is a schematic diagram of a composition structure of a network slice processing system according to an embodiment of the disclosure.

The embodiments of the disclosure provide a network slice processing system. Referring to FIG. 1, a network slice processing system 10 provided in the embodiments of the disclosure includes a network management system 11 and a slice processing device 12. The network management system 11 may communicate with the slice processing device 12. For example, a wired network may be created between the network management system 11 and the slice processing device 12, so that the network management system 11 may transmit data or information to the slice processing device 12. In another example, a wireless network may be created between the network management system 11 and the slice processing device 12, so that the network management system 11 may transmit data or information to the slice processing device 12.

In this embodiment of the disclosure, the network management system 11 is referred to as NMS for short. The network management system 11 is a parameter configuration terminal for network slicing. The network management system 11 may set various policies and requirements relevant to the network slice. For example, the network management system may include an end-to-end slice management function subsystem 111, an access network management subsystem 112, and a core network management subsystem 113. The access network management subsystem 112 may include an access network slice management subsystem. The core network management subsystem 113 may include a core network slice management subsystem.

The slice processing device 12 is a processing terminal for network slicing. The slice processing device 12 needs to perform, according to a configuration instruction of the network management system, the various policies and requirements based on the network slice. The slice processing device 12 may include at least one of the following devices: an access network device 121 and a core network device 122.

For example, the end-to-end slice management function subsystem 111 may generate a slice-level quality of service (QoS) parameter. The slice-level QoS parameter may include a first QoS parameter and a second QoS parameter. If the first QoS parameter is used for management of the access network device, the end-to-end slice management function subsystem 111 transmits the first QoS parameter to the access network management subsystem 112, for example, to the access network slice management subsystem. The access network management subsystem 112 configures (or transmits) the first QoS parameter to the access network device 121. If the second QoS parameter is used for management of the core network device, the end-to-end slice management function subsystem 111 transmits the second QoS parameter to the core network management subsystem 113, for example, to the core network slice management subsystem. The core network management subsystem 113 configures (or transmits) the second QoS parameter to the core network device 122.

For example, the access network device 121 may include a base station (referred to as gNB for short) in a 5G network, an enhanced base station (referred to as eNB for short) in a 4G network, a centralized unit (CU) or a distributed unit (DU) in a 5G base station, or the like. The core network device 122 may include an access and mobility management function (AMF) device, a session management function (SMF) device, or a user plane function (UPF) device.

Figure 2:
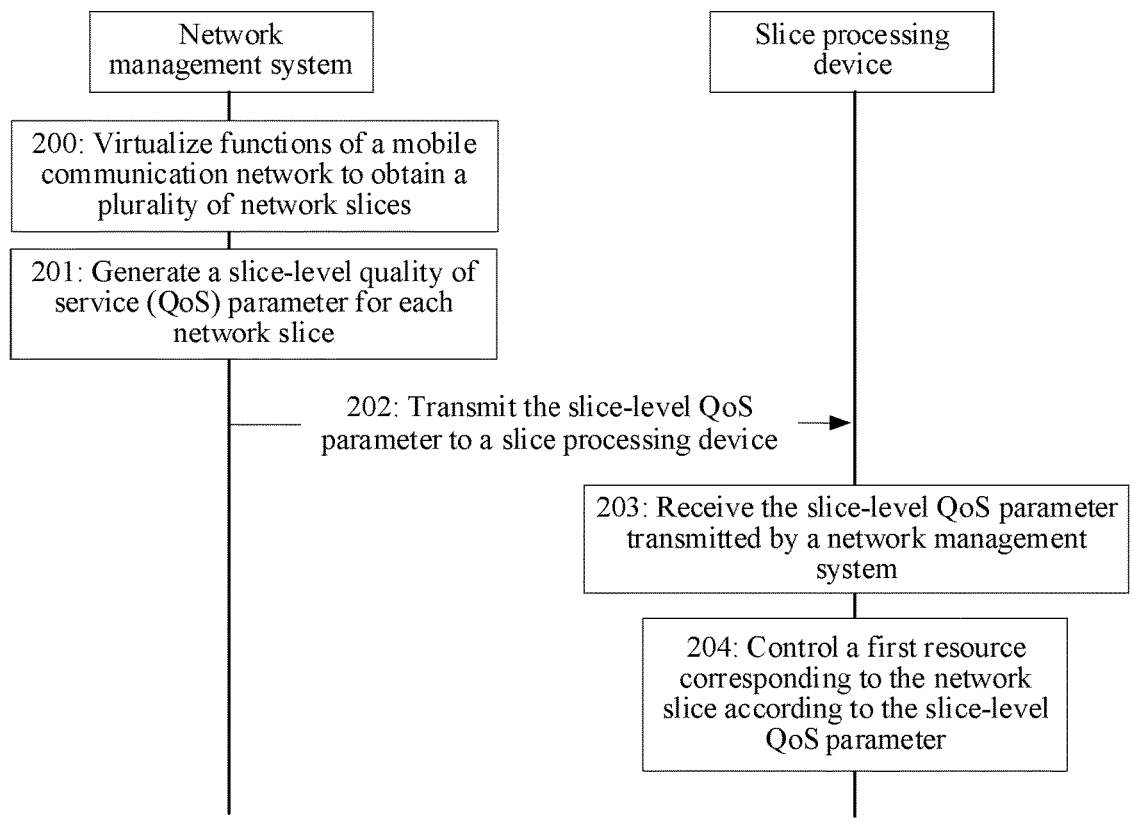
FIG. 2 is a schematic flowchart of interaction between a network management system and a slice processing device according to an embodiment of the disclosure.

An embodiment of the network slice processing method in the disclosure may be specifically applicable to a scenario of network slice configuration and execution. Referring to FIG. 2, the method is applicable to a network management system, such as the network management system 11 shown in FIG. 1, and may include the following operations 200-204:

Operation 200: Virtualize functions of a mobile communication network to obtain a plurality of isolated logical subnetworks, and use each logical subnetwork as a network slice.

In this embodiment of the disclosure, the network slices refer to a plurality of isolated logical subnetworks virtualized based on the mobile communication network. Each end-to-end network slice is formed by sub-slices individually of a wireless network, a transmission network, a core network, and is managed in union by an end-to-end network management system.

Operation 201: The network management system generates a slice-level QoS parameter for each network slice, the slice-level QoS parameter being used by the network management system to instruct a slice processing device to control a first resource corresponding to the network slice.

In this embodiment of the disclosure, the network management system generates the slice-level QoS parameter for the network slice. The network slice may be a to-be-created network slice, or the network slice refers to an already created network slice.

For example, a slice purchaser needs to modify a network slice purchased before. In this case, the network management system may generate a slice-level QoS parameter for the already created network slice. The slice level refers to a QoS parameter generated by the network management system that is set at a network-slice level. The slice-level QoS parameter is used by the network management system to instruct the slice processing device to control the first resource corresponding to the network slice.

The first resource in this embodiment of the disclosure refers to a resource corresponding to the network slice. In different implementation scenarios, there may be a plurality of implementations for the first resource. For example, the first resource may include a radio resource and/or a network forwarding resource. The radio resource includes but is not limited to a frequency resource and a slot resource.

For example, when the slice processing device is specifically an access network device, the first resource is specifically a radio resource. The radio resource may be alternatively referred to as an access network resource. When the slice processing device is specifically a core network device, the first resource is specifically a network forwarding resource.

In this embodiment of the disclosure, taking the dynamism and complexity of the resource into consideration, a more specific slice-level QoS parameter is defined. In this embodiment of the disclosure, the network management system generates the slice-level QoS parameter for the network slice, so that the network slice may provide a slice-level service function. For example, in this embodiment of the disclosure, the slice-level QoS parameter is used for the network slice, so that a slice industry more precisely defines requirements, and operators may guarantee a slice-level quality and have a capability of slice-level commercial use.

In this embodiment of the disclosure, the slice-level QoS parameter may include at least one of the following parameters: a slice-level priority parameter, a slice-level total uplink bandwidth, and a slice-level total downlink bandwidth. The slice-level priority parameter refers to setting different priorities for different network slices. The slice-level total uplink bandwidth refers to a sum of uplink bandwidth at which all users access to the network slice at a geographic location. The slice-level total downlink bandwidth refers to a sum of downlink bandwidth at which all users access the network slice at a geographic location. The slice-level total uplink bandwidth and the slice-level total downlink bandwidth may be alternatively combined to be referred to as slice-level total uplink and downlink bandwidth.

In this embodiment of the disclosure, when generating the priority parameter, the network management system generates the priority parameter at a slice level, and the same for generating the total uplink and downlink bandwidth.

In this embodiment of the disclosure, the slice-level QoS parameter includes a slice-level priority and the slice-level total uplink and downlink bandwidth. The slice-level total uplink and downlink bandwidth may be further divided as a slice-level total uplink bandwidth and a slice-level total downlink bandwidth. However, the slice-level QoS parameter in this embodiment of the disclosure is not limited to the foregoing illustrated slice-level priority and the slice-level total uplink and downlink bandwidth. The slice-level QoS parameter may further include other parameters set for a network slice, for example, a slice-level transmission control parameter.

Operation 202: The network management system transmits the slice-level QoS parameter to the slice processing device.

In this embodiment of the disclosure, after the network management system generates the slice-level QoS parameter, the network management system may transmit the slice-level QoS parameter to the slice processing device. It can be seen from the foregoing description of a connection relationship between the network management system and the slice processing device that the network management system may communicate with the slice processing device, so that after the network management system transmits the slice-level QoS parameter to the slice processing device, the slice processing device receives the slice-level QoS parameter and the slice processing device may further transmit a feedback message to the network management system. Therefore, the network management system may determine, according to the feedback message, whether the slice processing device receives the slice-level QoS parameter successfully.

In this embodiment of the disclosure, taking the dynamism and complexity of the resource into consideration, a more specific slice-level QoS parameter is defined. In this embodiment of the disclosure, the network management system delivers the slice-level QoS parameter to the slice processing device, so that the slice processing device controls the first resource corresponding to the network slice according to the slice-level QoS parameter, thereby implementing slice-level resource scheduling and control of slice-level resources, and enabling the network slice to provide a slice-level service function.

Operation 203: The slice processing device receives the slice-level QoS parameter transmitted by the network management system.

In this embodiment of the disclosure, after the network management system generates the slice-level QoS parameter, the network management system may transmit the slice-level QoS parameter to the slice processing device. It can be seen from the foregoing description of the connection relationship between the network management system and the slice processing device that the network management system may communicate with the slice processing device, so that after the network management system transmits the slice-level QoS parameter to the slice processing device, the slice processing device receives the slice-level QoS parameter and the slice processing device may further transmit a feedback message to the network management system. Therefore, the network management system may determine, according to the feedback message, whether the slice processing device receives the slice-level QoS parameter successfully.

Operation 204: The slice processing device controls the first resource corresponding to the network slice according to the slice-level QoS parameter.

In this embodiment of the disclosure, the network management system is a parameter configuration terminal for network slicing. The network management system may set various policies and requirements relevant to the network slice. The slice processing device is a processing terminal for network slicing. The slice processing device needs to perform, according to a configuration instruction of the network management system, the various policies and requirements based on the network slice. In an actual application, a specific processing procedure of the slice processing device may be described in detail according to a type of the slice processing device and parameter content included in the slice-level QoS parameter. For details, examples and illustrations in subsequent embodiments may be referred to.

In this embodiment of the disclosure, taking the dynamism and complexity of the resource into consideration, a more specific slice-level QoS parameter is defined. In this embodiment of the disclosure, the network management system delivers the slice-level QoS parameter to the slice processing device, so that the slice processing device controls the first resource corresponding to the network slice according to the slice-level QoS parameter. Therefore, compared with the related art in which the QoS may only be at a session level or a user equipment (UE) level, the slice-level QoS parameter corresponding to the network slice is used for controlling the first resource in this embodiment of the disclosure, thereby implementing slice-level resource scheduling and control of slice-level resources, and enabling the network slice to provide a slice-level service function.

It can be seen from the examples and illustrations in the foregoing embodiments that the network management system generates the slice-level QoS parameter for the network slice, the slice-level QoS parameter being used by the network management system to instruct the slice processing device to control the first resource corresponding to the network slice. Then the network management system transmits the slice-level QoS parameter to the slice processing device. The slice processing device receives the slice-level QoS parameter transmitted by the network management system, and then controls the first resource corresponding to the network slice according to the slice-level QoS parameter.

Figure 3A:
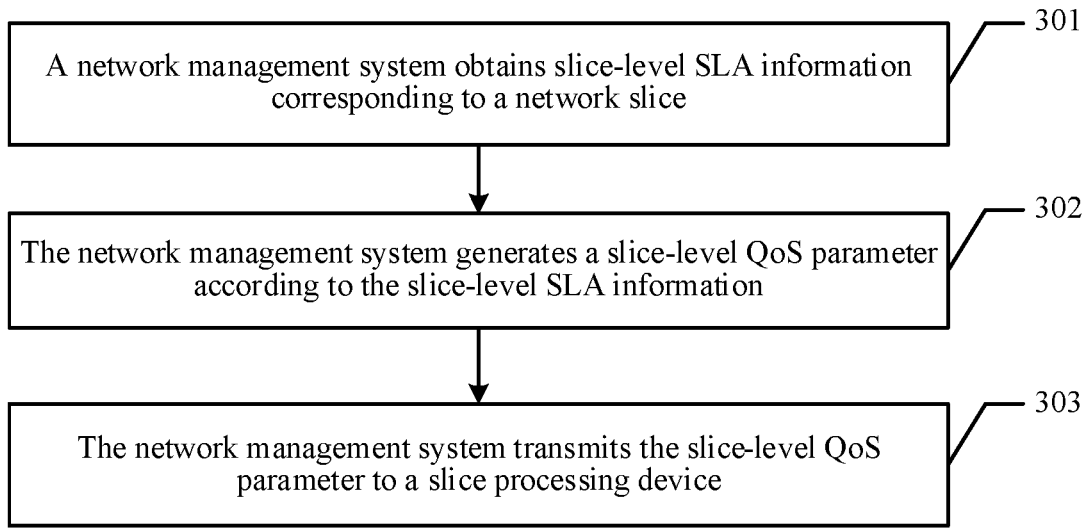
FIG. 3a is a schematic block flowchart of a network slice processing method performed by a network management system according to an embodiment of the disclosure.

Next, the network slice processing method provided in the embodiments of the disclosure is described in detail from a perspective of a network management system and a perspective of a slice processing device. At first, description is made on the network management system side. Referring to FIG. 3a, a network slice processing method performed by a network management system such as the network management system 11 shown in FIG. 1 may include the following operations 301-303:

Operation 301: A network management system obtains slice-level service-level agreement (SLA) information corresponding to a network slice.

In this embodiment of the disclosure, the network management system first obtains the slice-level SLA information. The slice-level SLA information may include various configuration and requirement information required for the network slice. The slice-level SLA information may include a plurality of types of configuration parameters of the network slice, which is not limited herein.

In this embodiment of the disclosure, the slice-level SLA information may be transmitted by a slice-triggering server to the network management system. For example, the slice-triggering server may be a server on a slice purchaser side or an internal slice-ordering server of an operator. The slice-triggering server first acquires the SLA information formed for the network slice, and then transmits the slice-level SLA information to the network management system.

Operation 302: The network management system generates a slice-level QoS parameter according to the slice-level SLA information.

In this embodiment of the disclosure, after obtaining the slice-level SLA information, the network management system may generate the foregoing slice-level QoS parameter according to the slice-level SLA information, that is, the network management system anatomizes the slice-level SLA information, and analyzes various performance requirements of the network slice, to generate the slice-level QoS parameter.

When obtaining the slice-level SLA information, the network management system extracts the following information individually from the slice-level SLA information: a slice-level priority parameter, a quantity of users allowed to access the slice in a geographic region, and a single-user access uplink rate, a single-user access downlink rate, and the like.

Figure 3B:
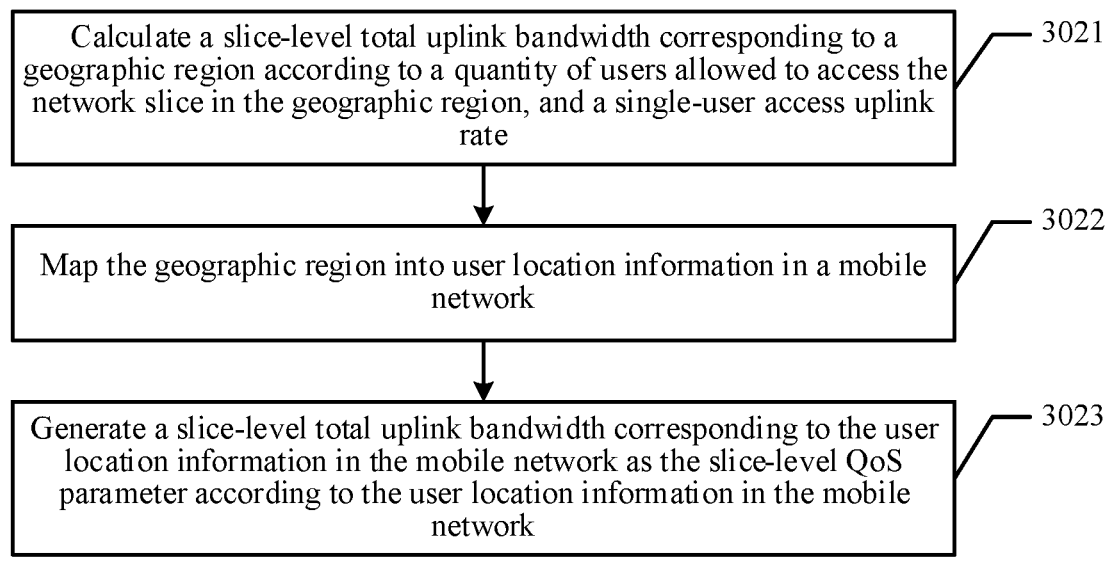
FIG. 3b is a schematic block flowchart of generation of a slice-level QoS parameter performed by a network management system according to an embodiment of the disclosure.

For example, in some embodiments of the disclosure, when the slice-level SLA information includes the quantity of users allowed to access the network slice in a geographic region, and the single-user access uplink rate, operation 302 in which the network management system generates the slice-level QoS parameter according to the slice-level SLA information includes the following operations which are shown in FIG. 3b and applicable to a network management system.

Operation 3021: Calculate a slice-level total uplink bandwidth corresponding to the geographic region according to the quantity of users allowed to access the network slice in the geographic region, and the single-user access uplink rate.

Operation 3022: Map the geographic region into user location information in the mobile network.

The user location information in the mobile network includes information about a tracking area (TA) in which a user is located or information about a cell to which a user obtains access.

Operation 3023: Generate a slice-level total uplink bandwidth corresponding to the user location information in the mobile network as the slice-level QoS parameter according to the user location information in the mobile network.

The slice-level total uplink bandwidth corresponding to the geographic region refers to a sum of uplink bandwidth at which all users access the network slice in the geographic region. The network management system indirectly obtains the slice-level total uplink bandwidth corresponding to the geographic region by multiplying the quantity of users allowed to access the network slice in the geographic region by the single-user access uplink rate.

After obtaining the slice-level total uplink bandwidth corresponding to the geographic region, the network management system generates the slice-level total uplink bandwidth corresponding to the user location information in the mobile network according to the user location information in the mobile network.

The geographic region refers to a general geographic location information, for example, a specific business region of a district. The network management system may map the geographic region into the user location information in the mobile network. The user location information in the mobile network includes information about a TA in which a user is located or information about a cell to which a user obtains access. For example, the network management system maps a first geographic region into first TA information, or first cell information. The TA information may include one or more TA identifiers. The cell information may include one or more cell identifiers.

In an embodiment of the disclosure, the foregoing operation 3023 of generating the slice-level total uplink bandwidth corresponding to the user location information according to the user location information includes the following operations:

determining a plurality of access network devices according to a correspondence between the user location information and the access network devices; and allocating the slice-level total uplink bandwidth corresponding to the geographic region to the plurality of access network devices according to a size of coverage of each access network device, to obtain a slice-level total uplink bandwidth corresponding to the each access network device.

For example, the network management system may determine one or more access network devices according to a correspondence between TA information and an access network device. Alternatively, the network management system may determine one or more access network devices according to a correspondence between cell information obtained by the mapping and an access network device. When the geographic region is mapped into one cell, the network management system may determine one access network device. When the geographic region is mapped into a plurality of cells, the network management system may determine one or more access network devices.

If the network management system determines a plurality of access network devices, the network management system allocates the slice-level total uplink bandwidth corresponding to the geographic region to the plurality of access network devices according to sizes of coverage of the plurality of access network devices. For example, a larger size of coverage of a specific access network device indicates that a higher slice-level total uplink bandwidth is allocated to the access network device by the network management system; and a smaller size of coverage of a specific access network device indicates that a lower slice-level total uplink bandwidth is allocated to the access network device by the network management system. A sum of a slice-level total uplink bandwidth allocated to all access network devices equals to the slice-level total uplink bandwidth corresponding to the geographic region.

In view of this, an example in which the slice processing device is an access network device is used, and when the network management system determines one access network device according to the user location information in the mobile network, the slice-level total uplink bandwidth corresponding to the user location information in the network equals to the slice-level total uplink bandwidth corresponding to the geographic region. When the network management system determines a plurality of access network devices according to the user location information in the mobile network, the sum of a slice-level total uplink bandwidth allocated to all access network devices equals to the slice-level total uplink bandwidth corresponding to the geographic region.

Figure 3C:
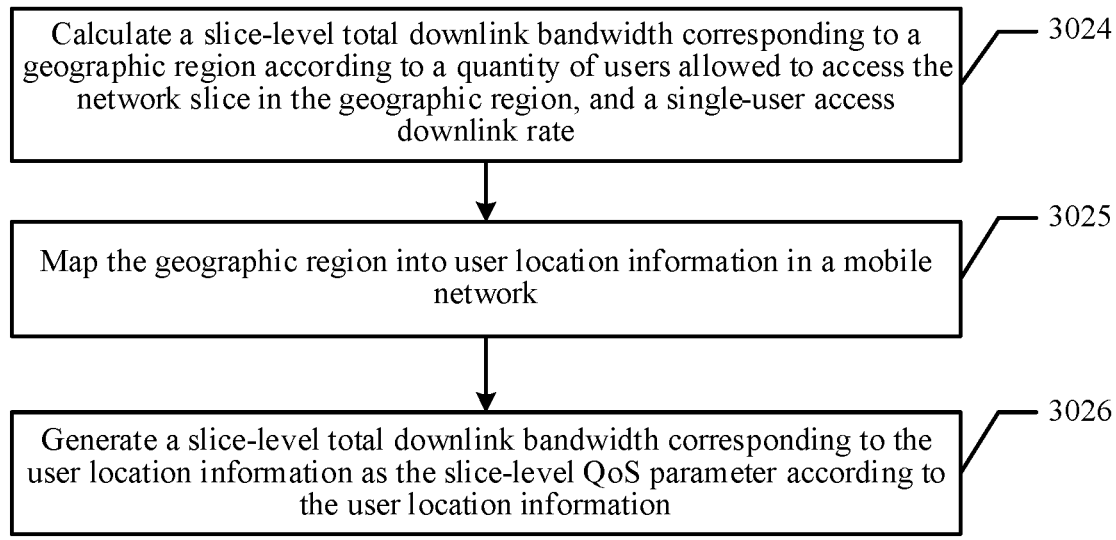
FIG. 3c is a schematic block flowchart of generation of another slice-level QoS parameter performed by a network management system according to an embodiment of the disclosure.

In some other embodiments of the disclosure, when the slice-level SLA information includes the quantity of users allowed to access the network slice in the geographic region, and the single-user access downlink rate, operation 302 of generating the slice-level QoS parameter according to the slice-level SLA information may include the following operations which are shown in FIG. 3c and applicable to a network management system.

Operation 3024: Calculate a slice-level total downlink bandwidth corresponding to the geographic region according to the quantity of users allowed to access the network slice in the geographic region, and the single-user access downlink rate.

Operation 3025: Map the geographic region into user location information in the mobile network.

Operation 3026: Generate a slice-level total downlink bandwidth corresponding to the user location information as the slice-level QoS parameter according to the user location information.

The slice-level total downlink bandwidth corresponding to the geographic region refers to a sum of downlink bandwidth at which all users access the network slice in the geographic region. The network management system indirectly obtains the slice-level total downlink bandwidth corresponding to the geographic region by multiplying the quantity of users allowed to access the network slice in the geographic region by the single-user access downlink rate.

After obtaining the slice-level total downlink bandwidth corresponding to the geographic region, the network management system generates the slice-level total downlink bandwidth corresponding to the user location information in the mobile network according to the user location information in the mobile network.

In an embodiment of the disclosure, the generating a slice-level total downlink bandwidth corresponding to the user location information according to the user location information includes the following operations:

determining a plurality of core network devices according to a correspondence between the user location information and the core network devices; and allocating the slice-level total downlink bandwidth corresponding to the geographic region to the plurality of core network devices according to a size of a range served by each core network device, to obtain a slice-level total downlink bandwidth corresponding to the each core network device.

For example, the network management system may determine one or more core network devices according to a correspondence between TA information and a core network device. Alternatively, the network management system may determine one or more core network devices according to a correspondence between cell information obtained by the mapping and a core network device. When the geographic region is mapped into one cell, the network management system may determine one core network device. When the geographic region is mapped into a plurality of cells, the network management system may determine one or more core network devices.

If the network management system determines a plurality of core network devices, the network management system allocates the slice-level total downlink bandwidth corresponding to the geographic region to the plurality of core network devices according to sizes of ranges served by the plurality of core network devices. For example, a larger range served by a specific core network device indicates a higher slice-level total downlink bandwidth that is allocated to the core network device by the network management system; and a smaller range served by a specific core network device indicates a lower slice-level total downlink bandwidth that is allocated to the core network device by the network management system. A sum of a slice-level total downlink bandwidth allocated to all core network devices equals to the slice-level total downlink bandwidth corresponding to the geographic region.

Additionally, the slice-level priority refers to different priorities of different network slices. In another embodiment of the disclosure, when the slice-level SLA information further includes a slice-level priority parameter corresponding to the network slice, the slice-level QoS parameter in the foregoing embodiments further includes the slice-level priority parameter.

A network slice corresponding to a slice-level priority is identified by using single network slice selection assistance information (S-NSSAI). A network slice corresponding to the slice-level total uplink bandwidth corresponding to the user location information in the mobile network is identified by using S-NSSAI. A network slice corresponding to the slice-level total downlink bandwidth corresponding to the user location information in the mobile network is identified by using S-NSSAI.

Operation 303: The network management system transmits the slice-level QoS parameter to the slice processing device.

In this embodiment of the disclosure, after the network management system generates the slice-level QoS parameter, the network management system may further transmit the slice-level QoS parameter to the slice processing device. It can be seen from the foregoing description of the connection relationship between the network management system and the slice processing device that the network management system may communicate with the slice processing device, so that after the network management system transmits the slice-level QoS parameter to the slice processing device, the slice processing device receives the slice-level QoS parameter, and the slice processing device may further transmit a feedback message to the network management system. Therefore, the network management system may determine, according to the feedback message, whether the slice processing device receives the slice-level QoS parameter successfully.

It can be seen from the examples and illustrations in the foregoing embodiment that in this embodiment of the disclosure, taking the dynamism and complexity of the resource into consideration, a more specific slice-level QoS parameter is defined. In this embodiment of the disclosure, the network management system delivers the slice-level QoS parameter to the slice processing device, so that the slice processing device controls the first resource corresponding to the network slice according to the slice-level QoS parameter, thereby implementing slice-level resource scheduling and control of slice-level resources, and enabling the network slice to provide a slice-level service function.

Figure 4:
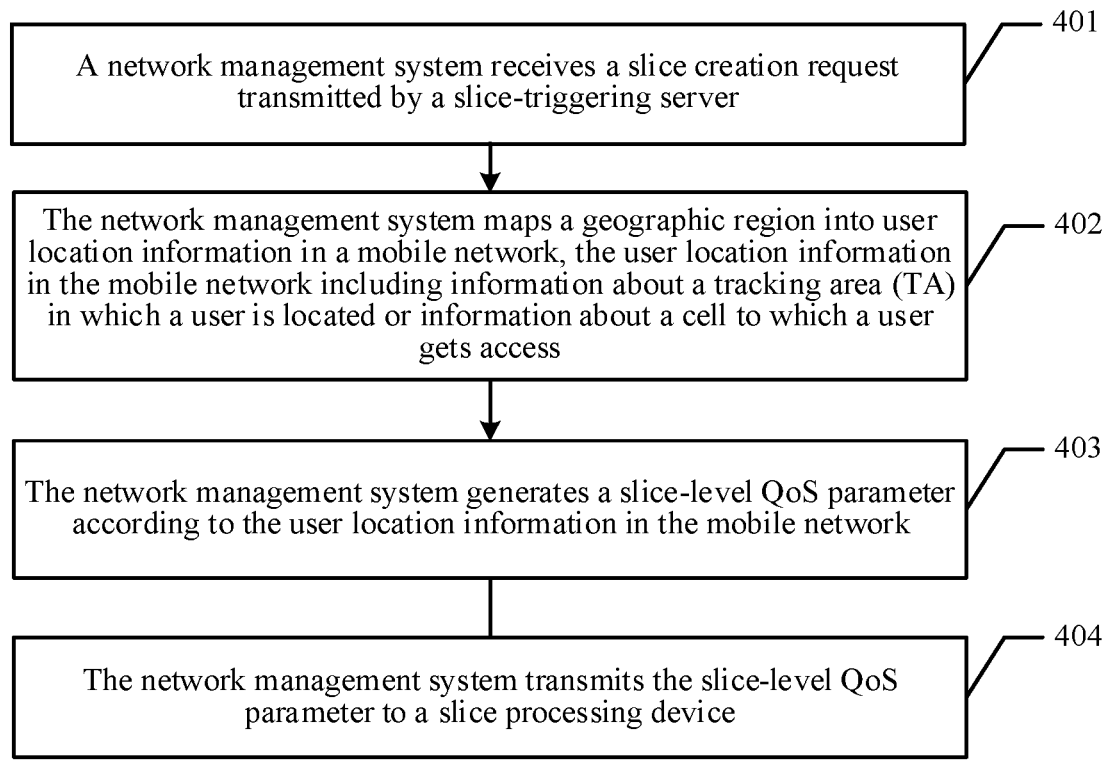
FIG. 4 is a schematic block flowchart of another network slice processing method performed by a network management system according to an embodiment of the disclosure.

Next, another network slice processing method provided in the embodiments of the disclosure is described on the network management system side. Referring to FIG. 4, a network slice processing method performed by a network management system such as the network management system 11 shown in FIG. 1 includes the following operations 401-404:

Operation 401: The network management system receives a slice creation request transmitted by a slice-triggering server, the slice creation request including a slice-level priority parameter, a slice-level total uplink bandwidth corresponding to a geographic region, and a slice-level total downlink bandwidth corresponding to the geographic region.

In this embodiment of the disclosure, the slice creation request may be transmitted by the slice-triggering server to the network management system. For example, the slice-triggering server may be a server on a slice purchaser side or an internal slice-ordering server of an operator. The slice-triggering server first acquires the slice creation request formed for the network slice, and then transmits the slice creation request to the network management system.

When the network management system obtains the slice creation request, the slice creation request carries information such as the slice-level priority parameter, the slice-level total uplink bandwidth in the geographic region, and the slice-level total downlink bandwidth in the geographic region. The geographic region refers to a general geographic location information, for example, a specific business region of a district. The network management system may map the geographic region into information about an access network device in a mobile network, one or more TAs managed by the access network device, or one or more pieces of cell information managed by the access network device.

Operation 402: The network management system maps the geographic region into user location information in the mobile network.

The user location information in the mobile network includes information about a TA in which a user is located or information about a cell to which a user obtains access.

Operation 403: The network management system generates a slice-level QoS parameter according to the user location information in the mobile network, the slice-level QoS parameter including at least one of the following parameters: the slice-level priority parameter, a slice-level total uplink bandwidth corresponding to the user location information, or the slice-level total downlink bandwidth corresponding to the user location information.

After obtaining the slice-level total uplink bandwidth corresponding to the geographic region, the network management system generates the slice-level total uplink bandwidth corresponding to the user location information in the mobile network according to the user location information in the mobile network. The foregoing description of operation 3023 may be referred to for a specific generation manner.

A network slice corresponding to the slice-level total uplink bandwidth corresponding to the user location information in the mobile network is identified by using S-NSSAI. For example, a current slice-level QoS parameter of 100 Mbps/S-NSSAI indicates that total uplink bandwidth corresponding to a network slice identified by using S-NSSAI is 100 Mbps.

Alternatively, after obtaining the slice-level total downlink bandwidth corresponding to the geographic region, the network management system generates the slice-level total downlink bandwidth corresponding to the user location information in the mobile network according to the user location information in the mobile network. The foregoing description of operation 3026 may be referred to for a specific generation manner.

A network slice corresponding to the slice-level total downlink bandwidth corresponding to the user location information in the mobile network is identified by using S-NSSAI.

In this embodiment of the disclosure, after obtaining the slice-level priority parameter, the slice-level total uplink bandwidth, and the slice-level total downlink bandwidth from the slice creation request, the network management system generates the slice-level QoS parameter according to the foregoing obtained parameters. Specific parameter content and a message format of the slice-level QoS parameter are not limited herein.

Operation 404: The network management system transmits the slice-level QoS parameter to the slice processing device.

In this embodiment of the disclosure, after the network management system generates the slice-level QoS parameter, the network management system may transmit the slice-level QoS parameter to the slice processing device. It can be seen from the foregoing description of the connection relationship between the network management system and the slice processing device that the network management system may communicate with the slice processing device, so that after the network management system transmits the slice-level QoS parameter to the slice processing device, the slice processing device receives the slice-level QoS parameter and the slice processing device may transmit a feedback message to the network management system. Therefore, the network management system may determine, according to the feedback message, whether the slice processing device receives the slice-level QoS parameter successfully.

It can be seen from the examples and illustrations in the foregoing embodiment that in this embodiment of the disclosure, taking the dynamism and complexity of the resource into consideration, a more specific slice-level QoS parameter is defined. In this embodiment of the disclosure, the network management system delivers the slice-level QoS parameter to the slice processing device, so that the slice processing device controls the first resource corresponding to the network slice according to the slice-level QoS parameter, thereby implementing slice-level resource scheduling and control of slice-level resources, and enabling the network slice to provide a slice-level service function.

In some embodiments of the disclosure, the foregoing operation 303 or operation 404 in which the network management system transmits the slice-level QoS parameter to the slice processing device includes the following operations:

When the slice processing device is specifically an access network device, and the first resource is a radio resource, the network management system transmits the slice-level total uplink bandwidth corresponding to the user location information to the access network device; or when the slice processing device is a core network device, and the first resource is a network forwarding resource, the network management system transmits the slice-level total downlink bandwidth corresponding to the user location information to the core network device.

When the slice-level QoS parameter further includes the slice-level priority parameter, the network management system may deliver the slice-level priority and a slice-level total uplink bandwidth corresponding to the user location information to the access network device, so that the access network device may control resources according to the slice-level priority and the slice-level total uplink bandwidth corresponding to the user location information in the mobile network.

When the slice-level QoS parameter further includes the slice-level priority parameter, the network management system may further deliver the slice-level priority and the slice-level total downlink bandwidth corresponding to the user location information to the core network device, so that the core network device may control resources according to the slice-level priority and the slice-level total downlink bandwidth corresponding to the user location information in the mobile network.

For different slice processing devices, specific content of the slice-level QoS parameter transmitted by the network management system may be different. The transmitted slice-level QoS parameter is determined according to a specific application scenario.

In some embodiments of the disclosure, the foregoing operation 303 or operation 404 in which the network management system transmits the slice-level QoS parameter to the slice processing device includes the following operations:

The network management system selects a first slice processing device from a preset slice processing device set according to user location information in the mobile network carried in the slice-level QoS parameter; and the network management system transmits the slice-level QoS parameter to the selected first slice processing device.

The slice processing device set may include an existing slice processing device supporting the network slice and a newly-created slice processing device supporting the network slice.

The slice processing device set may include a newly-created slice processing device and may further include an existing slice processing device. Which one of the slice processing devices is determined as the foregoing first slice processing device is determined according to a specific application scenario. For example, the first slice processing device may be a core network device supporting S-NSSAI.

For example, the slice-level QoS parameter generated by the network management system carries a geographic location. The first slice processing device is determined in a mobile network according to the geographic location. An example in which the slice processing device is an access network device is used. The network management system selects a first access network device from an access network device set according to the user location information in the mobile network carried in the slice-level QoS parameter. The access network device set includes an existing access network device supporting the network slice and a newly-created access network device supporting the network slice.

An example in which the slice processing device is a core network device is used. The network management system selects a first core network device from a core network device set according to the user location information in the mobile network carried in the slice-level QoS parameter. The core network device set includes an existing core network device supporting the network slice and a newly-created core network device supporting the network slice.

Figure 5:
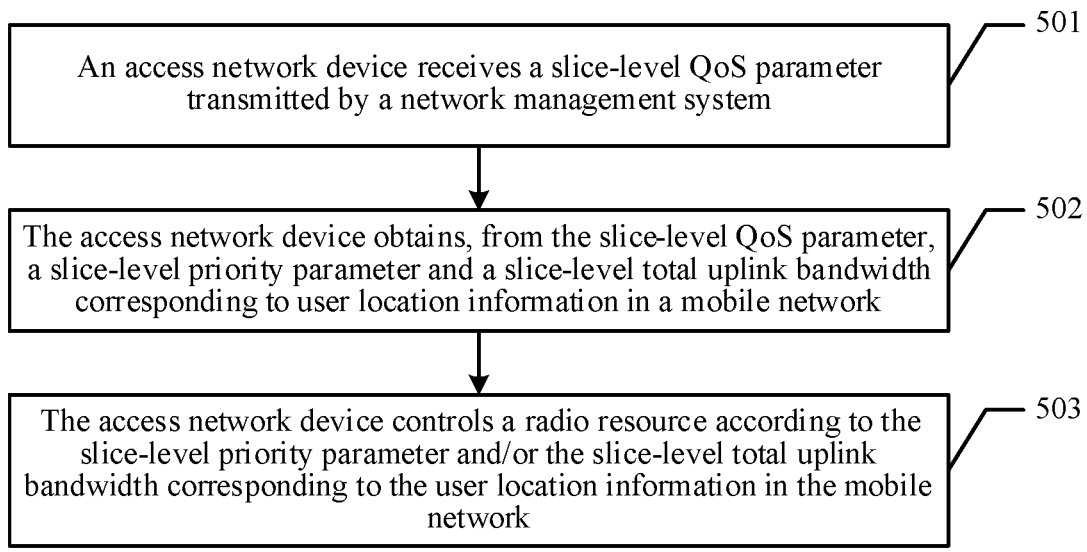
FIG. 5 is a schematic block flowchart of a network slice processing method performed by an access network device according to an embodiment of the disclosure.

Next, the network slice processing method provided in the embodiments of the disclosure is described in detail from the perspective of a slice processing device. The slice processing device may include an access network device and a core network device. Referring to FIG. 5, a network slice processing method performed by an access network device such as the access network device 121 shown in FIG. 1 is described in detail and may include the following operations 501-503:

Operation 501: The access network device receives a slice-level QoS parameter transmitted by a network management system.

In this embodiment of the disclosure, after the network management system generates the slice-level QoS parameter, the network management system may transmit the slice-level QoS parameter to the access network device. It can be seen from the foregoing description of the connection relationship between the network management system and the access network device that the network management system may communicate with the access network device, so that after the network management system transmits the slice-level QoS parameter to the access network device, the access network device receives the slice-level QoS parameter and the access network device may transmit a feedback message to the network management system. Therefore, the network management system may determine, according to the feedback message, whether the access network device receives the slice-level QoS parameter successfully.

Operation 502: The access network device obtains a slice-level priority parameter and a slice-level total uplink bandwidth corresponding to user location information in the mobile network from the slice-level QoS parameter.

In this embodiment of the disclosure, the network management system may deliver a slice-level priority and the slice-level total uplink bandwidth to the access network device. The access network device obtains the slice-level priority and the slice-level total uplink bandwidth from the slice-level QoS parameter.

Operation 503: The access network device controls a radio resource according to the slice-level priority parameter and/or the slice-level total uplink bandwidth corresponding to the user location information in the mobile network.

In this embodiment of the disclosure, after obtaining the slice-level priority and the slice-level total uplink bandwidth, the access network device may control the resources according to the slice-level priority and the slice-level total uplink bandwidth, or the access network device may control the resources according to the slice-level priority, or the access network device may control the resources according to the slice-level total uplink bandwidth. Specifically, a processing manner for resource control by the access network device may be determined according to an application scenario.

In some embodiments of the disclosure, operation 503 in which the access network device controls a radio resource according to the slice-level priority parameter and/or the slice-level total uplink bandwidth corresponding to the user location information in the mobile network includes at least one of the following operations:

The access network device allocates a maximum radio resource corresponding to the network slice according to the slice-level total uplink bandwidth; or the access network device segments all radio resources of the access network device into a plurality of radio sub-resources according to the slice-level total uplink bandwidth, and allocates the same radio sub-resource to the network slice when performing resource allocation each time; or the access network device segments all radio resources of the access network device into a plurality of radio sub-resources according to the slice-level total uplink bandwidth, and dynamically allocates a corresponding radio sub-resource from the plurality of radio sub-resources to the network slice when performing resource allocation each time; or the access network device limits uplink traffic of all users served by the access network device to no greater than the slice-level total uplink bandwidth; or the access network device schedules a radio resource corresponding to a network slice with a low priority to a network slice with a high priority according to the slice-level priority parameter.

For example, the access network device may allocate a maximum access network resource corresponding to the slice according to the slice-level total uplink bandwidth. The access network resources of all slices served by the access network device may be greater than or equal to a maximum distributable resource of the access network, that is, some access network resources may be multiplexed by a plurality of slices. A multiplexing ratio is determined by the slice-level SLA information and an operation policy of an operator.

In another example, when there are surplus access network resources, the access network device limits the uplink traffic of all users who obtain access from the access network device to no greater than the slice-level total uplink bandwidth corresponding to the user location information in the mobile network.

In another example, when the access network resource is in short or blocked, part or all of radio resources with a low slice priority may be released. The released radio resources may be allocated to a network slice with a high slice priority for use. A release ratio (or a ratio of released resources) may be agreed in the slice-level SLA information.

In another example, the access network device may fixedly segment the radio resource into different portions, each portion being an independent radio sub-resource. The radio sub-resource is a minimum schedulable resource block segmented according to frequency and time. Each portion of the radio sub-resource is allocated to a network slice for use. The different portions of radio sub-resources may or may not overlap in different network slices, or a part of radio sub-resources other than non-overlapped radio sub-resources may be specially reserved for a common share by different slices. Therefore, the access network device may control radio resources by using a network slice as granularity, and implement slice-level resource scheduling, so that a network slice may provide a slice-level service function.

Figure 6:
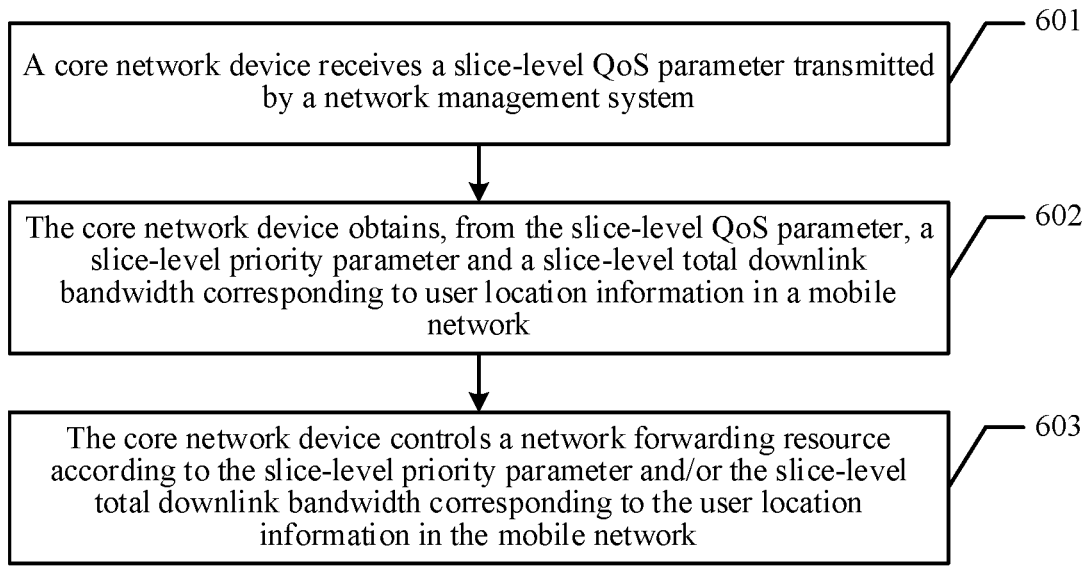
FIG. 6 is a schematic block flowchart of another network slice processing method performed by a core network device according to an embodiment of the disclosure.

Next, the network slice processing method provided in the embodiments of the disclosure is described in detail from the perspective of a slice processing device. The slice processing device may include an access network device and a core network device. Referring to FIG. 6, a network slice processing method performed by a core network device such as the core network device 122 shown in FIG. 1 is described in detail and may include the following operations 601-603:

Operation 601: The core network device receives a slice-level QoS parameter transmitted by a network management system.

In this embodiment of the disclosure, after the network management system generates the slice-level QoS parameter, the network management system may further transmit the slice-level QoS parameter to the core network device. It can be seen from the foregoing description of the connection relationship between the network management system and the core network device that the network management system may communicate with the core network device, so that after the network management system transmits the slice-level QoS parameter to the core network device, the core network device receives the slice-level QoS parameter and the core network device may further transmit a feedback message to the network management system. Therefore, the network management system may determine, according to the feedback message, whether the core network device receives the slice-level QoS parameter successfully.

Operation 602: The core network device obtains a slice-level priority parameter and a slice-level total downlink bandwidth corresponding to user location information in the mobile network from the slice-level QoS parameter.

In this embodiment of the disclosure, the network management system may deliver a slice-level priority and a slice-level total downlink bandwidth to the core network device. The core network device obtains the slice-level priority and the slice-level total downlink bandwidth from the slice-level QoS parameter.

Operation 603: The core network device controls a network forwarding resource according to the slice-level priority parameter and/or the slice-level total downlink bandwidth corresponding to the user location information in the mobile network.

In this embodiment of the disclosure, after obtaining the slice-level priority and the slice-level total downlink bandwidth, the core network device may control the resources according to the slice-level priority and the slice-level total downlink bandwidth, or the core network device may control the resources according to the slice-level priority, or the core network device may control the resources according to the slice-level total downlink bandwidth. Specifically, a processing manner for resource control by the core network device may be determined according to an application scenario.

In some embodiments of the disclosure, operation 603 in which the core network device controls a network forwarding resource according to the slice-level priority parameter and/or the slice-level total downlink bandwidth corresponding to the user location information in the mobile network includes at least one of the following operations:

The core network device limits downlink traffic of all users served by the core network device to no greater than the slice-level total downlink bandwidth corresponding to the user location information; or the core network device preferentially forwards, when the core network device is shared by a plurality of network slices with different priorities, downlink data corresponding to a network slice with a high priority according to the slice-level priority parameter by using the network forwarding resource.

For example, after obtaining the slice-level priority and the slice-level total downlink bandwidth, the core network device (such as a UPF in a 5G network) may limit total downlink bandwidth of a slice user in a region specified by the slice-level total downlink bandwidth. When being shared by a plurality of network slices, the core network device may also preferentially forward, according to configuration, downlink data of a user using a slice with a high priority. Therefore, the core network device may control resources by using a network slice as granularity, and implement slice-level resource scheduling, so that a network slice may provide a slice-level service function.

In some embodiments of the disclosure, when the core network device includes an AMF device, an SMF device, and a UPF device, an operation in which the core network device controls the network forwarding resource according to the slice-level priority parameter and/or the slice-level total downlink bandwidth corresponding to the user location information in the mobile network includes the following operations:

The AMF device receives a session management request transmitted by UE, the session management request including location information of the UE; and the AMF device selects the same SMF device based on the location information of the UE which is the same as the user location information in the mobile network, and the SMF device selects the same UPF device based on the location information of the UE which is the same as the user location information in the mobile network.

The AMF device may receive a session establishment request transmitted by the UE. The session establishment request may carry the location information of the UE. For example, the location information of the UE may be a TA or a cell of the UE in the mobile network. Additionally, the session establishment request may further carry slice selection assistance information. After receiving the request, for example, the AMF device may select the same SMF device according to the location information of the UE and radio access network (RAN) node information of a requester, that is, selects the same SMF device for users obtaining access through the user location information corresponding to the slice-level total downlink bandwidth in the mobile network.

After receiving the session management request transmitted by the AMF device, the SMF device selects the same UPF device according to the location information of the UE and the RAN node information of the requester, that is, selects the same UPF device for users obtaining access through the user location information in the mobile network specified by the slice-level total downlink bandwidth.

The session management request in this embodiment of the disclosure includes the location information of the UE, and the slice-level total downlink bandwidth in the slice-level QoS parameter corresponds to the user location information in the mobile network. Therefore, through matching of user location information in the mobile network, the same UPF device may be selected for the UE. Thus, the UPF device may perform requirements of the slice-level QoS parameter to perform slice-level management on user data.

For better understanding and implementation of the foregoing solutions of this embodiment of the disclosure, a corresponding application scenario is used as an example for a specific description in the following.

In this embodiment of the disclosure, the network management system may transmit the slice-level priority and the slice-level total uplink and downlink bandwidth to the slice processing device. This embodiment of the disclosure provides a method for distributing a slice-level QoS parameter during slice creation and a method for scheduling and ensuring the slice-level QoS parameter during slice running. In this embodiment of the disclosure, a slice industry more precisely defines requirements, and operators may guarantee a slice-level quality and have a capability of slice-level commercial use.

The access network device, core network device, and network management system involved in this embodiment of the disclosure belong to a mobile network system supporting the features of the network slice. The access network device provided in this embodiment of the disclosure includes but is not limited to a 5G access network device. The core network device provided in this embodiment of the disclosure includes but is not limited to a 5G core network device. The network management system provided in this embodiment of the disclosure includes but is not limited to a 5G network management system.

The slice-level QoS parameter provided in this embodiment of the disclosure may include: a slice-level priority and slice-level total uplink and downlink bandwidth (or rate). Next, the slice-level QoS parameter is described in detail.

Priorities of different network slices are defined by using the slice-level priority parameter. A mobile network may preferentially schedule resources to a network slice with a high priority for use according to the level of a priority.

The slice-level total uplink bandwidth (or rate) refers to total uplink bandwidth (or rate) at which a network slice may serve in a range of a specific geographic region, that is, maximum uplink bandwidth. The geographic region may be at a level of a specific access network device, one or more cells of a specific access network device, one or more TAs of a specific access network device.

The slice-level total downlink bandwidth (or rate) refers to total downlink bandwidth (or rate) at which a network slice may serve in a range of a specific geographic region, that is, maximum downlink bandwidth. The geographic region may be a size of a range served by a specific core network device.

The embodiments of the disclosure provide a method for distributing a slice-level QoS parameter during slice creation. The method for distributing a slice-level QoS parameter during slice creation may be based on a network management system 70 shown in FIG. 7. The network management system 70 may include an end-to-end slice management module 71, an access network slice management module 72, an access network device management module 73, a core network slice management module 74, and a core network device management module 75. The end-to-end slice management module 71 is connected to the access network slice management module 72 and the core network slice management module 74 separately. The access network slice management module 72 is connected to the access network device management module 73. The core network slice management module 74 is connected to the core network device management module 75.

The network management system 70 may obtain slice-level SLA information of an industry client, and convert the slice-level SLA information into a slice-level QoS parameter. Alternatively, the slice-level SLA information may directly include the slice-level QoS parameter. For example, the slice-level SLA information defines that uplink bandwidth of a slice in a specific region is 1 gigabit per second (Gbps). Uplink bandwidth at which the parameter is converted into slices in one or more TAs is 1 Gbps.

During slice creation, the network management system 70 delivers or configures the slice-level QoS parameter to an access network device or a core network device separately, and the slice-level QoS parameter is delivered to the access network device by the access network device management module 73 and is delivered to the core network device by the core network device management module 75. The access network device includes a 5G base station (referred to as gNB for short), a 4G enhanced base station (referred to as eNB for short), a CU of a 5G base station, a DU of a 5G base station, or the like. The core network device includes a UPF, a PCF, an AMF, or the like.

For the slice-level priority, the slice-level priority parameter is received by the end-to-end slice management module 71 and delivered by the end-to-end slice management module 71 to the access network slice management module 72, then delivered to the access network device management module 73, and then delivered to the access network device. The slice-level priority parameter is delivered by the end-to-end slice management module 71 to the core network slice management module 74, then delivered to the core network device management module 75, and then delivered to the core network device, including a UPF device and the like.

For the slice-level total uplink bandwidth, the end-to-end slice management module 71 receives the slice-level total uplink bandwidth or receives the slice-level SLA information which is converted into the slice-level QoS parameter. The slice-level total uplink bandwidth is one type of the slice-level QoS parameter. The slice-level total uplink bandwidth is delivered by the end-to-end slice management module 71 to the access network slice management module 72, then delivered to the access network device management module 73, and then delivered to the access network device.

For the slice-level total downlink bandwidth, the end-to-end slice management module 71 receives the slice-level total downlink bandwidth or converts the received slice-level SLA information into the slice-level QoS parameter. The slice-level total downlink bandwidth is delivered by the end-to-end slice management module 71 to the core network slice management module 74, then delivered to the core network device management module 75, and then delivered to the core network device, including a UPF, and the like.

The embodiments of the disclosure further provide a quality assurance method for a slice-level QoS parameter during slice running. The method may include a quality assurance mechanism at an access network side and a quality assurance mechanism at a core network side, and may include the following solutions.

For an access network device, after obtaining the slice-level priority parameter and the slice-level total uplink bandwidth, the access network device may perform slice-level access network resource scheduling based on such parameters, including the following process:

The access network device may allocate a maximum access network resource corresponding to the slice according to the slice-level total uplink bandwidth. The access network resources of all slices served by the access network device may be greater than or equal to a maximum distributable resource of the access network, that is, some access network resources may be multiplexed by a plurality of slices. A multiplexing ratio is determined by the slice-level SLA information and an operation policy of an operator.

A client of the slice industry needs to be informed of the maximum uplink bandwidth when buying a network slice from an operator. When there are surplus access network resources, the access network device limits the uplink traffic of all users who obtain access from the access network device to no greater than the slice-level total uplink bandwidth corresponding to the user location information in the mobile network.

When the access network resource is in short or blocked, part or all of slice resources with a low slice-level priority parameter may be released for allocation to a slice with a high slice-level priority parameter for use. A release ratio (or a ratio of released resources) may be carried in the slice-level SLA information.

For a core network device, after obtaining the slice-level priority parameter and the slice-level total downlink bandwidth, the core network device may control downlink traffic of a slice based on such parameters, including the following process:

After obtaining the slice-level priority parameter and the slice-level total downlink bandwidth, the UPF device (such as a 5G UPF) may limit total downlink bandwidth of a slice user in a region specified by the slice-level total downlink bandwidth. When being shared by a plurality of slices, the UPF device may also preferentially forward downlink data of a user using a slice with a high priority.

Figure 7:
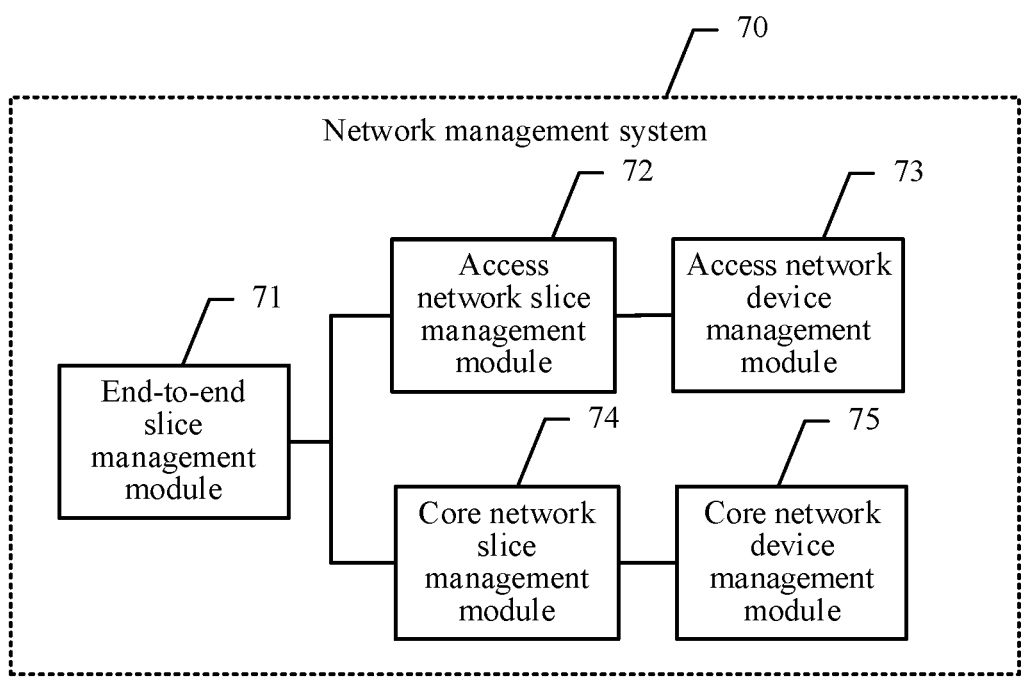
FIG. 7 is a schematic architectural diagram of a network management system in an actual scenario according to an embodiment of the disclosure.
Figure 8:
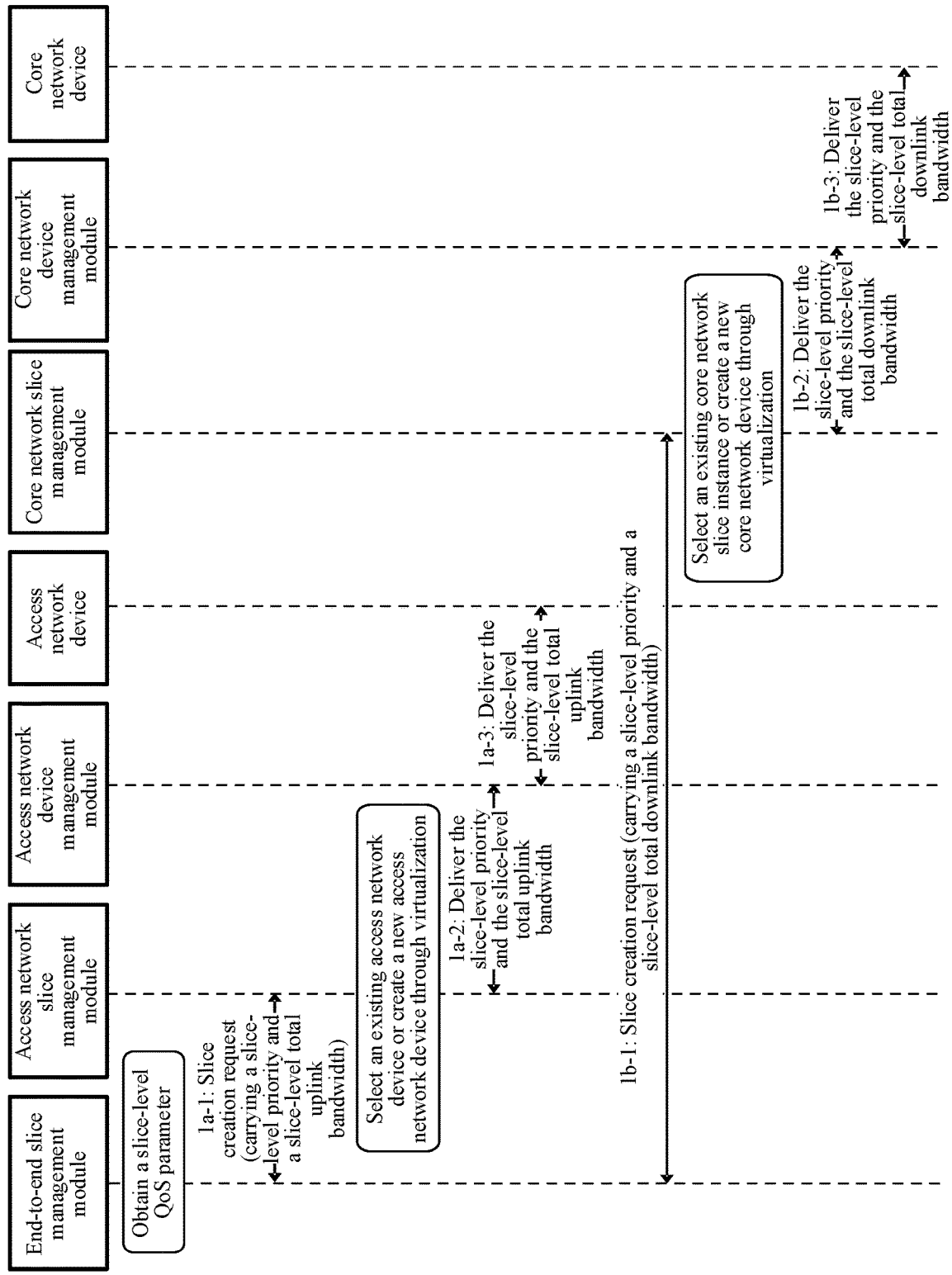
FIG. 8 is a schematic interaction flowchart in the system architecture shown in FIG. 7 according to an embodiment of the disclosure.

FIG. 8 is a schematic interaction flowchart in the system architecture shown in FIG. 7 according to an embodiment of the disclosure. The interaction process is described in detail in the following according to the foregoing description of the mechanism. A process of distributing a slice-level QoS parameter during slice creation is described in FIG. 8.

First, a pre-processing is performed on the network management system as follows.

The end-to-end slice management module receives a slice creation request. The slice creation request may be alternatively referred to as a request for an operation of slice instance distribution. The slice creation request carries slice-level SLA information or a slice-level QoS parameter.

When the request carries slice-level SLA information, the request carries one or more pieces of the following information: a slice-level priority parameter, a slice-level total uplink bandwidth in a specific geographic region or a quantity of users allowed to access a slice in a specific geographic region and a single-user access uplink rate, and a slice-level total downlink bandwidth in a specific geographic region or a quantity of users allowed to access a slice in a specific geographic region and a single-user access downlink rate.

When the request carries the slice-level QoS parameter, the request carries a slice-level priority parameter, a slice-level total uplink bandwidth in a specific geographic region, a slice-level total downlink bandwidth in a specific geographic region, and the like.

The foregoing geographic region in the request refers to a general geographic location information, for example, a specific business region of a district.

The end-to-end slice management module receives the slice-level priority parameter according to the foregoing information, maps the geographic region into user location information in the mobile network, maps the user location information in the mobile network into access network device information, information about one or more TAs managed by the access network device, or information about one or more cells managed by the access network device, and directly obtains the slice-level total uplink bandwidth and the slice-level total downlink bandwidth that correspond to the geographic region, or indirectly obtains, by multiplying a quantity of users obtaining access in a specific region by single-user uplink and downlink rates, the slice-level priority parameter and a slice-level total uplink bandwidth and a slice-level total downlink bandwidth that correspond to the user location information in the mobile network.

Operation 1a-1: The end-to-end slice management module transmits information such as the slice-level priority parameter and the slice-level total uplink bandwidth to the access network slice management module by including such information in the slice creation request (or slice distribution request).

Operation 1a-2: The access network slice management module selects an existing access network device to support a newly-created slice. The slice may be identified by using S-NSSAI. The S-NSSAI may be generated in the end-to-end slice management module, or an access network device is newly created through a virtualization technology, for example, an access network device is newly created by calling the capacity of management and orchestration (MANO).

The access network slice management module transmits the slice-level priority parameter and the slice-level total uplink bandwidth to the access network device management module by transmitting a slice provision request to the access network device management module.

Operation 1a-3: The access network device management module delivers the slice-level priority parameter and the slice-level total uplink bandwidth to an access network device supporting the S-NSSAI.

Operation 1b-1: The end-to-end slice management module transmits information such as the slice-level priority parameter and the slice-level total downlink bandwidth to the core network slice management module by including such information in the slice creation (or distribution) request.

Operation 1b-2: The core network slice management module selects an existing core network slice instance to support a newly-created slice. The slice may be identified by using S-NSSAI. The S-NSSAI may be generated in the end-to-end slice management module, or a core network device is newly created through the virtualization technology, for example, the core network device is newly created through the capacity of MANO.

The core network slice management module transmits the slice-level priority parameter and the slice-level total downlink bandwidth to the core network device management module by transmitting a slice provision request to the core network device management module.

Operation 1b-3: The core network device management module delivers the slice-level priority parameter and the slice-level total downlink bandwidth to a core network device supporting newly-created S-NSSAI, the core network device being a device such as an AMF, an SMF, a UPF in the slice.

Operation 1b-1 and operation 1a-1 in the foregoing processes may be performed simultaneously by the end-to-end slice management module, or operation 1b-1 may be performed after operation 1a-3 is completed, or operation 1a-1 may be performed after operation 1b-3 is completed. The access network slice management module may transmit a response message to the end-to-end slice management module in response to the request in operation 1a-1 after operation 1a-2 and operation 1a-3 are completed. The request in operation 1b-1 may be responded to immediately upon reception, or may be responded to after operation 1b-2 and operation 1b-3 are completed.

Figure 9:
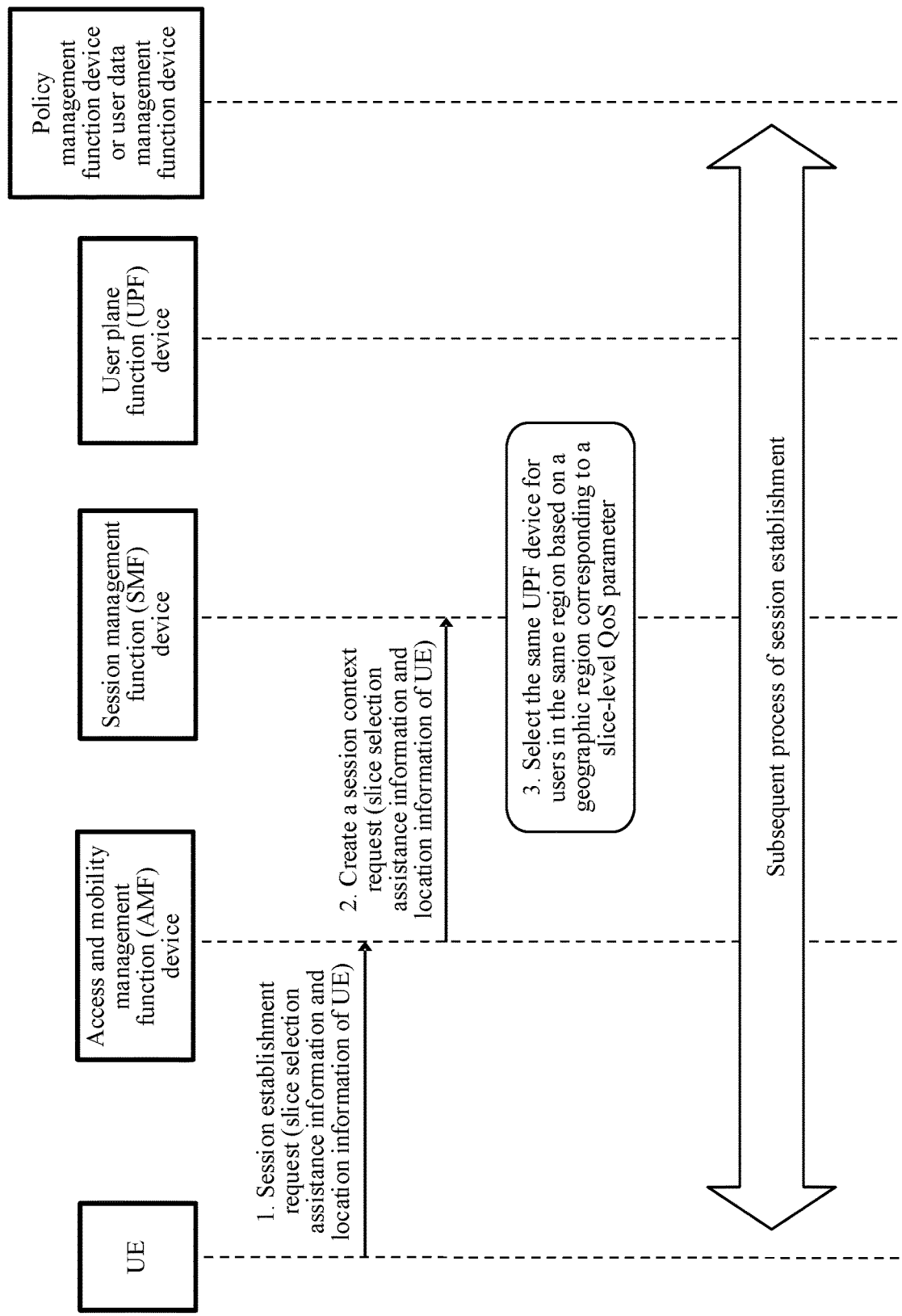
FIG. 9 is a schematic diagram of a session establishment process according to an embodiment of the disclosure.

To support control of total downlink bandwidth and a priority by a core network device (such as a UPF device) of a slice, for a network position specified by the slice-level total downlink bandwidth, the same UPF device (such as a 5G UPF) needs to be selected for users who obtain access from a location in the network which is specified by the slice-level total downlink bandwidth. FIG. 9 is a schematic diagram of a session establishment process according to an embodiment of the disclosure, mainly including the following process:

1. UE transmits a session establishment request to an AMF device, the session establishment request including slice selection assistance information and location information of the UE.

The UE initiates the session establishment request, the session establishment request including S-NSSAI and the location information of the UE. The location information of the UE may be a cell identifier or a TA identifier.

2. The AMF device creates a session context request, and transmits the session context request to the SMF device. The session context request includes the slice selection assistance information and the location information of the UE.

After receiving the request, the AMF device selects the same SMF device according to the location information of the UE and RAN node information of a requester, that is, selects the same SMF device for users obtaining access through the user location information in the mobile network.

3. The SMF device selects the same UPF device for users in the same region based on a geographic region corresponding to a slice-level QoS parameter.

After receiving the request, in addition to communicating with a policy management function device or a user data management function device, the SMF device selects the same UPF device according to the foregoing location information of the UE and the RAN node information of the requester, that is, selects the same UPF device for users obtaining access through the user location information in the mobile network specified by the slice-level total downlink bandwidth.

After the foregoing three operations are performed, the session establishment process continues to be performed.

In some embodiments of the disclosure, after receiving the slice-level priority parameter and the slice-level total uplink bandwidth, the access network device performs joint scheduling according to the slice-level QoS parameter in combination with QoS parameters of users who obtain access currently or a stream-level QoS parameter, which may include but not limited to the following operations:

The access network device may fixedly segment a radio resource (including but not limited to a frequency resource and a slot resource) into different portions (e.g., radio sub-resources). Each portion is allocated to a slice for use. The different portions of radio sub-resources may or may not overlap in different slices, or a part of radio resources other than non-overlapped radio resources may be specially reserved for a common share by different slices.

The access network device may not fixedly allocate some radio resources (including but not limited to frequency resources and slot resources) to a specific slice for use, but dynamically schedules radio resources to the specific slice for use.

The access network device may preferentially schedule data of a slice with a high priority according to the slice-level priority parameter. The radio resource may preferentially guarantee the data of the slice with a high priority, or the access network device may schedule part of resources of a slice with a low priority to a slice with a high priority for use according to configuration.

The access network device limits, based on the slice-level total uplink bandwidth, a total uplink rate of users obtaining access in a region of a network position corresponding to the parameter to no greater than a slice-level total uplink bandwidth corresponding to the user location information in the mobile network.

That the radio resources are allocated to a specific slice for use herein means that radio data corresponding to the radio resources carries and transmits stream data of a slice user.

In some embodiments of the disclosure, the UPF device processes a data package according to the slice-level priority parameter and the slice-level total downlink bandwidth, which may include the following process.

After obtaining the slice-level priority parameter and the slice-level total downlink bandwidth, the UPF device (such as a 5G UPF) may limit total downlink bandwidth of a slice user in a region specified by the slice-level total downlink bandwidth. When being shared by a plurality of slices, the UPF device may also preferentially forward downlink data of a user using a slice with a high priority according to configuration.

It can be seen from the examples and illustrations in the foregoing embodiments that the network slice technology is an essential technology for serving industry clients in a 5G era. Requirements for a mobile network by current industry clients are relatively broad. In addition to consideration of the dynamism and complexity of the resource, a more specific slice-level network requirement parameter needs to be defined. The embodiments of the disclosure define a slice-level QoS parameter and provide a distribution method and a quality assurance method, thereby facilitating better network resource scheduling by a mobile network, meeting requirements of an industry client, and promoting commercialization application of the network slice technology.

In the foregoing embodiments of the disclosure, a maximum geographic range of the slice-level total uplink and downlink bandwidth provided by the technical solutions is a size of coverage of a single access network device. When the geographic region is larger than the size of coverage of a single access network device, a new solution is needed. However, the new scenario may be resolved by decomposing into scenarios in which a range is covered by a single access network device.

To simplify the description, the foregoing method embodiments are described as a series of action combination. However, a person of ordinary skill in the art would understand that the disclosure is not limited to any described sequence of the action, as some operations may adopt other sequences or may be executed simultaneously according to the disclosure. In addition, a person skilled in the art is further to understand that the embodiments described in this specification are all example embodiments, and the involved actions and modules are not necessarily required by the disclosure.

To better implement the foregoing solutions in the embodiments of the disclosure, related apparatuses for implementing the foregoing solutions are further provided below.

Figure 10:
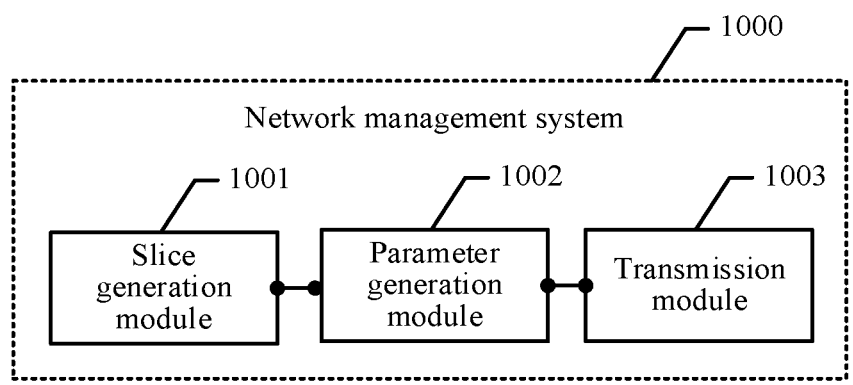
FIG. 10 is a schematic structural diagram of modules of a network management system according to an embodiment of the disclosure.

Referring to FIG. 10, a network management system 1000 provided in an embodiment of the disclosure may include: a slice generation module 1001, a parameter generation module 1002, and a transmission module 1003.

The slice generation module 1001 is configured to virtualize functions of a mobile communication network to obtain a plurality of isolated logical subnetworks, and use each logical subnetwork as a network slice.

The parameter generation module 1002 is configured to generate a slice-level QoS parameter for each network slice, the slice-level QoS parameter being used by the network management system to instruct a slice processing device to control a first resource corresponding to the network slice.

The transmission module 1003 is configured to transmit the slice-level QoS parameter to the slice processing device.

In some embodiments of the disclosure, the parameter generation module 1002 may be configured to obtain slice-level SLA information corresponding to the network slice, and generate the slice-level QoS parameter according to the slice-level SLA information.

In some embodiments of the disclosure, when the slice-level SLA information includes a quantity of users allowed to access the network slice in a geographic region, and a single-user access uplink rate, the parameter generation module 1002 may be configured to calculate a slice-level total uplink bandwidth corresponding to the geographic region according to the quantity of users allowed to access the network slice in the geographic region, and the single-user access uplink rate; map the geographic region into user location information in the mobile network; and generate a slice-level total uplink bandwidth corresponding to the user location information as the slice-level QoS parameter according to the user location information.

In some embodiments of the disclosure, the parameter generation module 1002 may be configured to determine a plurality of access network devices according to a correspondence between the user location information and the access network devices; and allocate the slice-level total uplink bandwidth corresponding to the geographic region to the plurality of access network devices according to a size of coverage of each access network device, to obtain a slice-level total uplink bandwidth corresponding to the each access network device.

In some embodiments of the disclosure, when the slice-level SLA information includes a quantity of users allowed to access the network slice in a geographic region, and a single-user access downlink rate, the parameter generation module 1002 may be configured to calculate a slice-level total downlink bandwidth corresponding to the geographic region according to the quantity of users allowed to access the network slice in the geographic region, and the single-user access downlink rate; map the geographic region into user location information in the mobile network; and generate a slice-level total downlink bandwidth corresponding to the user location information as the slice-level QoS parameter according to the user location information.

In some embodiments of the disclosure, the parameter generation module 1002 may be configured to determine a plurality of core network devices according to a correspondence between the user location information and the core network devices; and allocate the slice-level total downlink bandwidth corresponding to the geographic region to the plurality of core network devices according to a size of a range served by each core network device, to obtain a slice-level total downlink bandwidth corresponding to the each core network device.

In some embodiments of the disclosure, the parameter generation module 1002 may be configured to receive a slice creation request transmitted by a slice-triggering server, the slice creation request including a slice-level priority parameter, a slice-level total uplink bandwidth corresponding to a geographic region, and a slice-level total downlink bandwidth corresponding to the geographic region; map the geographic region into user location information in the mobile network; and generate the slice-level QoS parameter according to the user location information in the mobile network, the slice-level QoS parameter including at least one of the following parameters: the slice-level priority parameter, a slice-level total uplink bandwidth corresponding to the user location information, or the slice-level total downlink bandwidth corresponding to the user location information.

In some embodiments of the disclosure, the user location information in the mobile network includes information about a TA in which a user is located or information about a cell to which a user obtains access.

In some embodiments of the disclosure, the transmission module 1003 may be configured to transmit, when the slice processing device is an access network device and the first resource is a radio resource, the slice-level total uplink bandwidth corresponding to the user location information to the access network device.

In some embodiments of the disclosure, the transmission module 1003 may be configured to transmit, when the slice processing device is a core network device and the first resource is a network forwarding resource, the slice-level total downlink bandwidth corresponding to the user location information to the core network device.

In some embodiments of the disclosure, the transmission module 1003 may be configured to select a first slice processing device from a preset slice processing device set according to user location information in the mobile network carried in the slice-level QoS parameter; and transmit the slice-level QoS parameter to the selected first slice processing device.

In some embodiments of the disclosure, the slice processing device set includes an existing slice processing device supporting the network slice and a newly-created slice processing device supporting the network slice.

Figure 11:
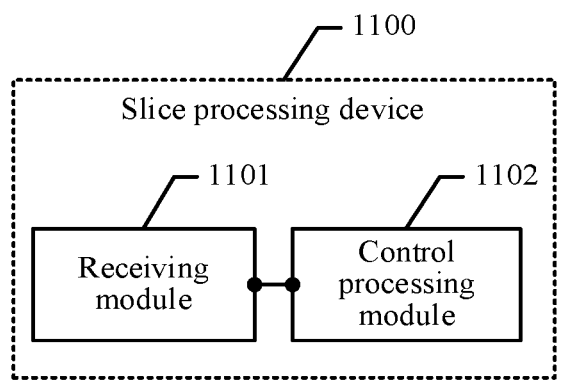
FIG. 11 is a schematic structural diagram of modules of a slice processing device according to an embodiment of the disclosure.

Referring to FIG. 11, a slice processing device 1100 provided in an embodiment of the disclosure may include: a receiving module 1101 and a control processing module 1102.

The receiving module 1101 is configured to receive a slice-level QoS parameter transmitted by a network management system. The network management system virtualizes functions of a mobile communication network to obtain a plurality of isolated logical subnetworks, uses each logical subnetwork as a network slice, and generates the slice-level QoS parameter for the each network slice.

The control processing module 1102 is configured to control a first resource corresponding to the network slice according to the slice-level QoS parameter.

In some embodiments of the disclosure, when the slice processing device is an access network device, and the first resource is a radio resource, the control processing module 1102 may be used by the access network device to obtain, from the slice-level QoS parameter, a slice-level priority parameter and a slice-level total uplink bandwidth corresponding to user location information in the mobile network; and the access network device controls the radio resource according to the slice-level priority parameter and/or the slice-level total uplink bandwidth corresponding to the user location information.

In some embodiments of the disclosure, the control processing module 1102 may be used by the access network device to allocate a maximum radio resource corresponding to the network slice according to the slice-level total uplink bandwidth corresponding to the user location information.

In some embodiments of the disclosure, the control processing module 1102 may be used by the access network device to limit uplink traffic of all users served by the access network device to no greater than the slice-level total uplink bandwidth corresponding to the user location information.

In some embodiments of the disclosure, the control processing module 1102 may be used by the access network device to schedule a radio resource corresponding to a network slice with a low priority to a network slice with a high priority according to the slice-level priority parameter.

In some embodiments of the disclosure, when the slice processing device is a core network device, and the first resource is a network forwarding resource, the control processing module 1102 may be used by the core network device to obtain, from the slice-level QoS parameter, a slice-level priority parameter and a slice-level total downlink bandwidth corresponding to user location information in the mobile network; and the core network device controls the network forwarding resource according to the slice-level priority parameter and/or the slice-level total downlink bandwidth corresponding to the user location information.

In some embodiments of the disclosure, the control processing module 1102 may be configured to limit downlink traffic of all users served by the core network device to no greater than the slice-level total downlink bandwidth corresponding to the user location information.

In some embodiments of the disclosure, the control processing module 1102 may be configured to preferentially forward, when the core network device is shared by a plurality of network slices with different priorities downlink data corresponding to the network slice with a high priority according to the slice-level priority parameter by using the network forwarding resource.

In some embodiments of the disclosure, when the core network device includes an AMF device, an SMF device, and a UPF device, the control processing module 1102 may be configured to receive a session management request transmitted by UE, the session management request including location information of the UE; and select the same SMF device based on the location information of the UE which is the same as the user location information in the mobile network, and the SMF device selects the same UPF device based on the location information of the UE which is the same as the user location information in the mobile network.

It can be seen from the examples and illustrations in the foregoing embodiment that the network management system first generates the slice-level QoS parameter for the network slice, the slice-level QoS parameter being used by the network management system to instruct the slice processing device to control the first resource corresponding to the network slice. Then the network management system transmits the slice-level QoS parameter to the slice processing device. The slice processing device first receives the slice-level QoS parameter transmitted by the network management system, and then controls the first resource corresponding to the network slice according to the slice-level QoS parameter. In this embodiment of the disclosure, taking the dynamism and complexity of the resource into consideration, a more specific slice-level QoS parameter is defined. In this embodiment of the disclosure, the network management system delivers the slice-level QoS parameter to the slice processing device, so that the slice processing device controls the first resource corresponding to the network slice according to the slice-level QoS parameter, thereby implementing slice-level resource scheduling and control of slice-level resources, and enabling the network slice to provide a slice-level service function.

Figure 12:
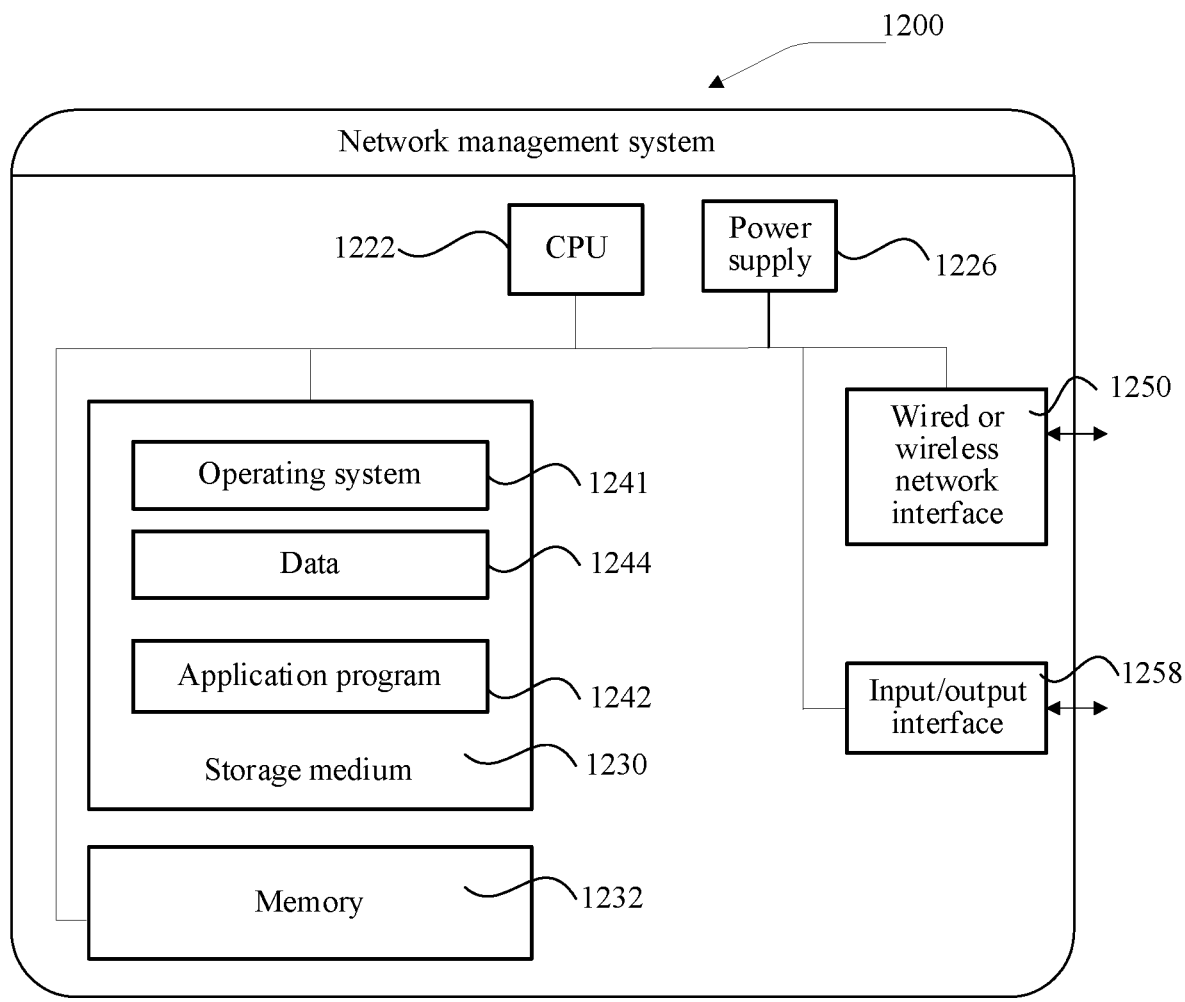
FIG. 12 is a schematic structural diagram of modules of another network management system according to an embodiment of the disclosure.

FIG. 12 is a schematic structural diagram of a network management system according to an embodiment of the disclosure. A network management system 1200 may vary greatly due to different configurations or performance, and may include one or more central processing units (CPU) 1222 (for example, one or more processors) and a memory 1232, and one or more storage media 1230 (for example, one or more mass storage devices) that store an application program 1242 or data 1244. The memory 1232 and the storage medium 1230 may implement non-transitory storage medium and transient storage or permanent storage. The program stored in the storage medium 1230 may include one or more modules (not shown in the figure), and each module may include a series of instructions and operations for the network management system. Still further, the CPU 1222 may be configured to communicate with the storage medium 1230 to perform the series of instruction operations in the storage medium 1230 in the network management system 1200.

The network management system 1200 may further include one or more power supplies 1226, one or more wired or wireless network interfaces 1250, one or more input/output interfaces 1258, and/or one or more operating systems 1241, for example, Windows Server™, Mac OS X™, Unix™, Linux™, or FreeBSD™.

Operations of the method performed by the network management system in the foregoing embodiments may be based on the structure of the network management system shown in FIG. 12.

Figure 13:
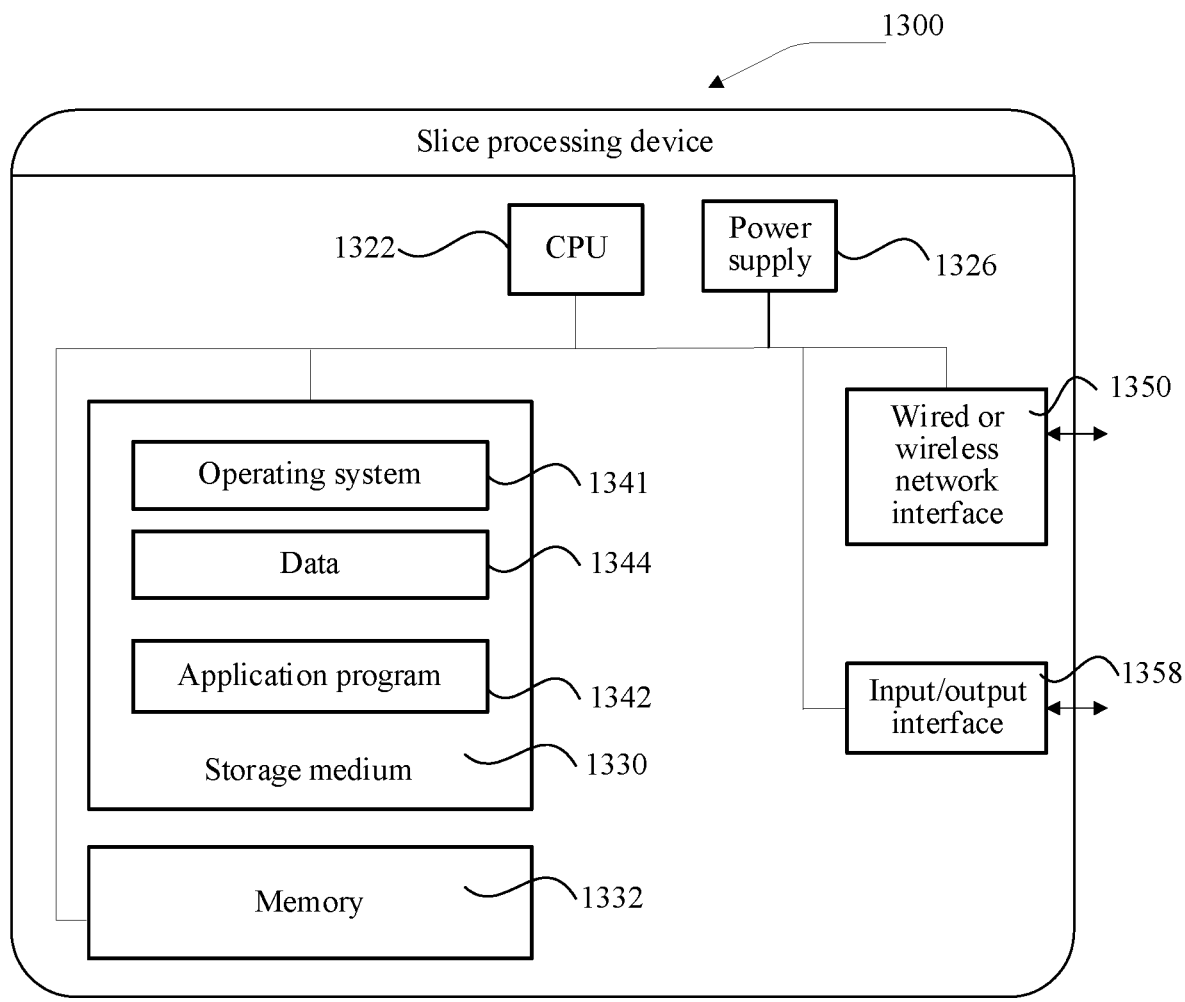
FIG. 13 is a schematic structural diagram of modules of another slice processing device according to an embodiment of the disclosure.

FIG. 13 is a schematic structural diagram of a slice processing device according to an embodiment of the disclosure. A slice processing device 1300 may vary greatly due to different configurations or performance, and may include one or more CPUs 1322 (for example, one or more processors), a memory 1332, and one or more storage media 1330 (for example, one or more mass storage devices) that store an application program 1342 or data 1344. The memory 1332 and the storage medium 1330 may implement non-transitory storage medium and transient storage or permanent storage. The program stored in the storage mediums 1330 may include one or more modules (not shown in the figure), and each module may include a series of instruction operations in a slice processing device. Still further, the CPU 1322 may be configured to communicate with the storage medium 1330 to perform the series of instruction operations in the storage medium 1330 on the slice processing device 1300.

The slice processing device 1300 may further include one or more power supplies 1326, one or more wired or wireless network interfaces 1350, one or more input/output interfaces 1358, and/or one or more operating systems 1341, for example, Windows Server™, Mac OS X™, Unix™, Linux™, or FreeBSD™.

Operations of the method performed by the slice processing device in the foregoing embodiments may be based on the structure of the slice processing device shown in FIG. 13.

In addition, the described apparatus embodiment is merely an example. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. In addition, in the accompanying drawings of the apparatus embodiments provided in the disclosure, connection relationships between modules indicate that the modules have communication connections with each other, which may be implemented as one or more communication buses or signal cables. A person of ordinary skill in the art would understand and implement the embodiments without creative efforts.

Based on the descriptions of the foregoing implementations, a person skilled in the art would clearly understand that the disclosure may be implemented by software in addition to necessary universal hardware, or by dedicated hardware, including a dedicated integrated circuit, a dedicated CPU, a dedicated memory, a dedicated component, and the like. Generally, any functions that may be performed by a computer program may be easily implemented by using corresponding hardware. Moreover, a specific hardware structure used to achieve the same function may be of various forms, for example, in a form of an analog circuit, a digital circuit, or a dedicated circuit. However, for the disclosure, software program implementation is a better implementation in most cases. Based on such an understanding, the technical solutions of the disclosure essentially, or the part contributing to the related art may be implemented in the form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the disclosure.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

To sum up, the foregoing embodiments are merely intended for describing the technical solutions of the disclosure, but not for limiting the disclosure. Although the disclosure is described in detail with reference to the foregoing embodiments, it is to be understood by a person of ordinary skill in the art that they may still make modifications to the technical solutions described in the foregoing embodiments or make equivalent replacements to some technical features thereof, without departing from the spirit and scope of the technical solutions of the embodiments of the disclosure.

What is claimed is:

1. A network slice processing method, applicable to a network management system, the method comprising:
   virtualizing functions of a mobile communication network to obtain a plurality of isolated logical subnetworks, and using each logical subnetwork as a network slice;
   generating a slice-level quality of service (QoS) parameter for each network slice, the slice-level QoS parameter being used by the network management system to instruct a slice processing device to control a first resource corresponding to the network slice; and
   transmitting the slice-level QoS parameter to the slice processing device,
   wherein the generating the slice-level quality of service (QoS) parameter for each network slice comprises any of a first case and a second case,
   wherein at least the first case comprises:
      receiving a slice creation request from a slice-triggering server, the slice creation request comprising a slice-level priority parameter, a slice-level total uplink bandwidth corresponding to a geographic region, and a slice-level total downlink bandwidth corresponding to the geographic region;
      mapping the geographic region into user location information in a mobile network; and
      generating the slice-level QoS parameter according to the user location information in the mobile network, the slice-level QoS parameter comprising at least one of the slice-level priority parameter, a slice-level total uplink bandwidth corresponding to the user location information, or a slice-level total downlink bandwidth corresponding to the user location information, and
   wherein at least the second case comprises:
      obtaining slice-level service-level agreement (SLA) information corresponding to the network slice;
      generating the slice-level QoS parameter according to the slice-level SLA information, the slice-level SLA information comprises a quantity of users allowed to access the network slice in a geographic region, and a single-user access uplink rate;
      calculating the slice-level total uplink bandwidth corresponding to the geographic region, according to the quantity of users allowed to access the network slice in the geographic region and the single-user access uplink rate;
      mapping the geographic region into user location information in the mobile network; and
      generating a slice-level total uplink bandwidth corresponding to the user location information as the slice-level QoS parameter according to the user location information.

2. The method according to claim 1, wherein the generating the slice-level total uplink bandwidth corresponding to the user location information according to the user location information comprises:
   determining a plurality of access network devices according to a correspondence between the user location information and the plurality of access network devices; and
   allocating the slice-level total uplink bandwidth corresponding to the geographic region to the plurality of access network devices according to a size of coverage of each access network device, to obtain a slice-level total uplink bandwidth corresponding to each access network device.

3. The method according to claim 1, wherein the slice-level SLA information comprises a quantity of users allowed to access the network slice in a geographic region, and a single-user access downlink rate, and
   wherein the generating the slice-level QoS parameter according to the slice-level SLA information comprises:
   calculating the slice-level total downlink bandwidth corresponding to the geographic region, according to the quantity of users allowed to access the network slice in the geographic region and the single-user access downlink rate;
   mapping the geographic region into user location information in the mobile network; and
   generating a slice-level total downlink bandwidth corresponding to the user location information as the slice-level QoS parameter according to the user location information.

4. The method according to claim 3, wherein the generating the slice-level total downlink bandwidth corresponding to the user location information according to the user location information comprises:
   determining a plurality of core network devices according to a correspondence between the user location information and the plurality of core network devices;
   allocating the slice-level total downlink bandwidth corresponding to the geographic region to the plurality of core network devices according to a size of a range served by each core network device, to obtain a slice-level total downlink bandwidth corresponding to each core network device.

5. The method according to claim 3, wherein the slice processing device is a core network device and the first resource is a network forwarding resource, and
wherein the transmitting the slice-level QoS parameter to the slice processing device comprises:
transmitting the slice-level total downlink bandwidth corresponding to the user location information to the core network device.

6. The method according to claim 1, wherein the user location information in the mobile network comprises information about a tracking area (TA) in which user equipment is located or information about a cell to which the user equipment obtains access.

7. The method according to claim 1, wherein the slice processing device is an access network device and the first resource is a radio resource, and wherein the transmitting the slice-level QoS parameter to the slice processing device comprises: transmitting the slice-level total uplink bandwidth corresponding to the user location information to the access network device.

8. The method according to claim 1, wherein the transmitting the slice-level QoS parameter to the slice processing device comprises:
selecting a first slice processing device from a preset slice processing device set according to user location information in a mobile network included in the slice-level QoS parameter; and
transmitting the slice-level QoS parameter to the selected first slice processing device.

9. The method according to claim 8, wherein the preset slice processing device set comprises an existing slice processing device supporting the network slice and a newly-created slice processing device supporting the network slice.

10. A non-transitory computer-readable storage medium, storing a computer program, the computer program, when executed by a processor, implementing the method according to claim 1.

11. A network slice processing method, applied to a slice processing device, the method comprising:
receiving a slice-level quality of service (QoS) parameter from a network management system, the a slice-level QoS parameter being generated for each network slice, which corresponds to each of a plurality of isolated logical subnetworks obtained from the network management system based on virtualizing functions of a mobile communication network; and
controlling a first resource corresponding to the network slice according to the slice-level QoS parameter,
wherein the slice processing device is an access network device and the first resource is a radio resource, and
wherein the controlling the first resource corresponding to the network slice according to the slice-level QoS parameter comprises:
obtaining, by the access network device, from the slice-level QoS parameter, a slice-level priority parameter and a slice-level total uplink bandwidth corresponding to user location information in a mobile network; and
controlling, by the access network device, the radio resource according to the slice-level priority parameter and/or the slice-level total uplink bandwidth corresponding to the user location information.

12. The method according to claim 11, wherein the controlling, by the access network device, the radio resource according to the slice-level total uplink bandwidth corresponding to the user location information comprises:
allocating, by the access network device, a maximum radio resource corresponding to the network slice according to the slice-level total uplink bandwidth corresponding to the user location information.

13. The method according to claim 11, wherein the controlling, by the access network device, the radio resource according to the slice-level total uplink bandwidth corresponding to the user location information comprises:
limiting, by the access network device, uplink traffic of all users served by the access network device to no greater than the slice-level total uplink bandwidth corresponding to the user location information.

14. The method according to claim 11, wherein the controlling, by the access network device, the radio resource according to the slice-level priority parameter comprises:
scheduling, by the access network device, a radio resource corresponding to a network slice with a low priority to a network slice with a high priority according to the slice-level priority parameter.

15. A network management system:
at least one memory configured to store program code; and
at least one processor configured to read the program code and operate as instructed by the program code, the program code comprising:
virtualization code configured to cause at least one of the at least one processor to virtualize functions of a mobile communication network to obtain a plurality of isolated logical subnetworks, and use each logical subnetwork as a network slice;
generation code configured to cause at least one of the at least one processor to generate a slice-level quality of service (QoS) parameter for each network slice, the slice-level QoS parameter being used by the network management system to instruct a slice processing device to control a first resource corresponding to the network slice; and
transmission code configured to cause at least one of the at least one processor to transmit the slice-level QoS parameter to the slice processing device,
wherein the generating the slice-level quality of service (QoS) parameter for each network slice comprises:
receiving a slice creation request from a slice-triggering server, the slice creation request comprising a slice-level priority parameter, a slice-level total uplink bandwidth corresponding to a geographic region, and a slice-level total downlink bandwidth corresponding to the geographic region;
mapping the geographic region into user location information in a mobile network; and
generating the slice-level QoS parameter according to the user location information in the mobile network, the slice-level QoS parameter comprising at least one of the slice-level priority parameter, a slice-level total uplink bandwidth corresponding to the user location information, or a slice-level total downlink bandwidth corresponding to the user location information.

16. A slice processing device, comprising a processor and a memory,
the memory being configured to store instructions; and
the processor being configured to execute the instructions in the memory, to perform the method according to claim 11.

* * * * *